United States Patent
Nakajima

(10) Patent No.: US 7,561,318 B2
(45) Date of Patent: Jul. 14, 2009

(54) OPTICAL SCANNING APPARATUS AND IMAGE FORMING APPARATUS

(75) Inventor: Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 266 days.

(21) Appl. No.: 11/497,334

(22) Filed: Aug. 2, 2006

(65) Prior Publication Data

US 2007/0035796 A1   Feb. 15, 2007

(30) Foreign Application Priority Data

Aug. 4, 2005   (JP)   ............................. 2005-226118

(51) Int. Cl.
*G02B 26/08* (2006.01)
*B41J 2/435* (2006.01)

(52) U.S. Cl. .............. 359/204.1; 359/204.3; 359/204.4; 347/232; 347/235; 347/236

(58) Field of Classification Search .................. None
See application file for complete search history.

(56) References Cited

U.S. PATENT DOCUMENTS

| | | | | |
|---|---|---|---|---|
| 5,497,184 A | * | 3/1996 | Saito et al. | 347/257 |
| 6,038,051 A | * | 3/2000 | Suzuki et al. | 359/204 |
| 6,469,818 B1 | * | 10/2002 | Kato | 359/204 |
| 7,057,782 B2 | * | 6/2006 | Kudo | 359/216 |
| 2003/0234968 A1 | * | 12/2003 | Kudo | 359/204 |
| 2004/0109211 A1 | * | 6/2004 | Kato | 359/204 |
| 2007/0091404 A1 | * | 4/2007 | Miyamoto | 359/204 |

FOREIGN PATENT DOCUMENTS

| | | | |
|---|---|---|---|
| JP | 6-164056 | | 6/1994 |
| JP | 09-230259 | * | 9/1997 |
| JP | 2002-40350 | | 2/2002 |
| JP | 2002-040350 | * | 2/2002 |
| JP | 2002-341273 | | 11/2002 |
| JP | 2003-211728 | | 7/2003 |

OTHER PUBLICATIONS

U.S. Appl. No. 12/028,446, filed Feb. 8, 2008, Nakamura, et al.

* cited by examiner

*Primary Examiner*—James Phan
(74) *Attorney, Agent, or Firm*—Oblon, Spivak, McClelland, Maier & Neustadt, P.C.

(57) ABSTRACT

A disclosed optical scanning apparatus for scanning a scanning surface using a light beam, the optical scanning apparatus comprises: a light source having a plurality of luminous sources; a deflection unit collectively deflecting a plurality of light beams emitted from the plural luminous sources; a light guiding unit guiding at least a portion of each of the plural light beams to a predetermined direction without using the deflection unit; and a photo-detection system receiving the plural guided light beams and the plural deflected light beams and outputting a signal based on the received light beams.

10 Claims, 17 Drawing Sheets

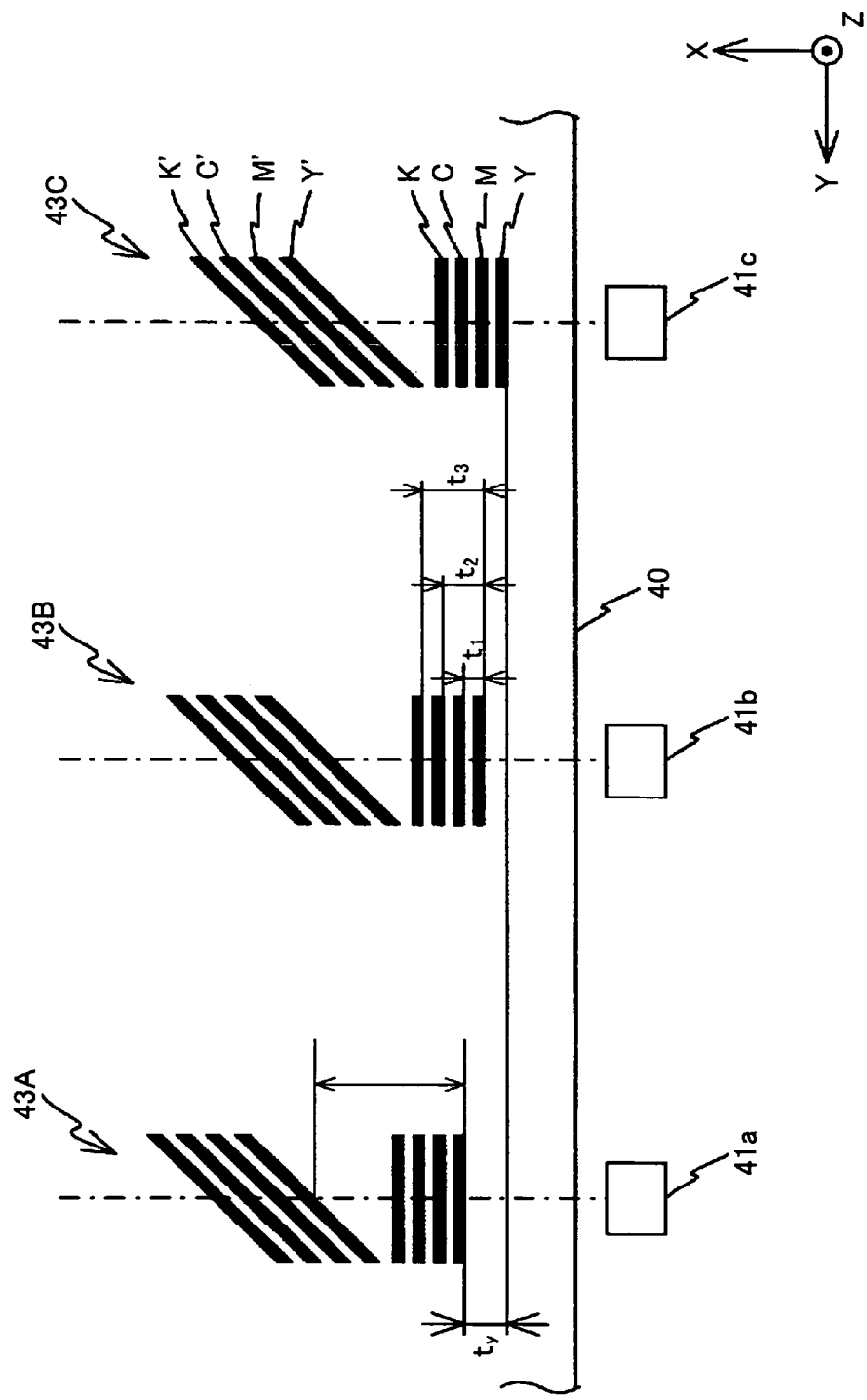

OPTICAL SCANNING APPARATUS AND IMAGE FORMING APPARATUS

BACKGROUND OF THE INVENTION

1. Field of the Invention

The present invention relates to an optical scanning apparatus and an image forming apparatus, and more particularly to an optical scanning apparatus for scanning a light beam on a scanning surface and an image forming apparatus for forming an image on a recording medium based on image information.

2. Description of the Related Art

Conventionally, image forming apparatuses for forming multicolor images using the Carlson process include image forming apparatuses such that latent images corresponding to black, yellow, magenta, and cyan image elements are formed on each surface of four photoconductor drums by an optical scanning apparatus and toner images obtained by visualizing these latent images using toner corresponding to each color are superimposed and fixed on paper as a recording medium, thereby forming multicolor images.

In recent years, image forming apparatuses of this type have been frequently used for simplified printing as on-demand printing systems and there has been an increasing demand for improvement of productivity thereof and providing high-quality images. According to one method of improving the productivity, the number of the rotation R (rpm) of a polygon mirror for deflecting a light beam and the speed V (m/s) of a transfer body are increased so as to have a faster printing speed.

In general, a relationship between the speed V of the transfer body and the number of the rotation R of the polygon mirror is represented as the following formula:

$$m \geq (60/R \cdot N) \times (D/25.4) \times V$$

where m indicates the number of light beams, N indicates the number of deflected surface of the polygon mirror, and D indicates recording density (dpi).

However, when the number of the rotation of the polygon mirror is increased, the amount of heating from a relevant driving system is increased. Thus, a scanning position is changed with the passage of time as a result of distortion of a housing, for example, so that displacement of resist, a tilt of a scanning line, and the like are generated. Accordingly, color drift is generated.

In view of this, a surface emitting semiconductor laser array in which plural luminous sources for emitting light beams are arranged has been frequently used so as to reduce the number of rotation of the polygon mirror within a range such that the above-mentioned formula is satisfied. In a multi-beam optical scanning apparatus using such a laser array with plural luminous sources, if the amount of light in each luminous source is not correctly adjusted, irregularity of thickness is generated on a printed image. Accordingly, the tint of color is changed especially in a multicolor image and this may cause the degradation of image quality.

In view of this, in order to use such a surface emitting semiconductor laser array as a light source, as disclosed in Patent Documents 1 and 2, an image forming apparatus has been proposed in which a light beam from the light source is split and output of the light beam emitting from each luminous source is set to have the same amount while monitoring the split light beam via a light detecting sensor, thereby preventing the degradation of image quality.

However, when a beam splitting optical system and a light detecting sensor are to be disposed in addition, there is a problem in that the number of members, time required for adjustment, and manufacturing costs thereof are increased.

Patent Document 1: Japanese Patent No. 2908652
Patent Document 2: Japanese Laid-Open Patent Application No. 2002-40350

SUMMARY OF THE INVENTION

It is a general object of the present invention to provide an improved and useful optical scanning apparatus and image forming apparatus in which the above-mentioned problems are eliminated.

A more specific object of the present invention is to provide an optical scanning apparatus that can reduce the number of members of the apparatus and manufacturing cost thereof while maintaining scanning accuracy.

Another object of the present invention is to provide an image forming apparatus that can reduce the number of members of the apparatus and manufacturing cost thereof while maintaining image quality.

According to one aspect of the present invention, there is provided an optical scanning apparatus for scanning a scanning surface using a light beam, the optical scanning apparatus comprising: a light source having a plurality of luminous sources; a deflection unit collectively deflecting a plurality of light beams emitted from each of the plural luminous sources; a light guiding unit guiding at least a portion of each of the plural light beams to a predetermined direction without using the deflection unit; and a photo-detection system receiving the plural guided light beams and the plural deflected light beams and outputting a signal based on the received light beams.

According to the above-mentioned apparatus, at least a portion of light beams emitted from each of the luminous sources of the light source is guided in a predetermined direction and the other light beams are deflected via the deflection unit. And the guided light beams and the deflected light beams are received by the common photo-detection system.

Thus, it is possible to share the photo-detection system so as to monitor the amount of light of the light beams and to detect the deflected light beams for generating a synchronization signal. In accordance with this, it is possible to reduce the number of members of the apparatus while maintaining scanning accuracy thereof and to reduce a production cost thereof as a result.

According to another aspect of the present invention, there is provided an optical scanning apparatus, further including: a light source driving unit performing, until the photo-detection system detects deflected light beams after the deflection unit started deflection, driving the plural luminous sources in a successive manner, monitoring a signal based on a light beam from the driven luminous source, the signal being output from the photo-detection system, and setting output of each of the plural luminous sources.

According to another aspect of the present invention, there is provided an optical scanning apparatus, wherein the light guiding unit splits the plural light beams into light beams in a direction of the deflection unit and light beams in the predetermined direction.

According to another aspect of the present invention, there is provided an optical scanning apparatus, wherein each deflection direction of the plural luminous sources is set in the same direction and the light guiding unit guides either component of S-polarized light or component of P-polarized light of each of the plural light beams.

According to another aspect of the present invention, there is provided an optical scanning apparatus, wherein the photo-detection system outputs a signal based on intensity of received light beams and a signal obtained by binarizing the intensity-based signal.

According to another aspect of the present invention, there is provided an optical scanning apparatus wherein the light source and the photo-detection system are mounted on the same substrate.

According to another aspect of the present invention, there is provided an optical scanning apparatus, further including: an imaging optical system for imaging light beams on the scanning surface, the light beams being deflected using the deflection unit, wherein the photo-detection system directly receives the plural deflected light beams without using the imaging optical system.

According to another aspect of the present invention, there is provided an optical scanning apparatus, wherein the imaging optical system includes an optical element in which a diffraction plane for diffracting light beams deflected by the deflection unit is formed, and the diffraction plane has power for correcting focus movement regarding a deflection direction of the plural light beams depending on a difference in wavelength among the plural light beams.

According to another aspect of the present invention, there is provided an image forming apparatus for forming an image by fixing a toner image on a recording medium, the toner image being formed based on a latent image obtained from image information, the image forming apparatus comprising: any one of the above-mentioned optical scanning apparatuses, and a photoconductor having a scanning surface in which a latent image is formed by the optical scanning apparatus.

In accordance with this, since the image forming apparatus includes any one of the above-mentioned optical scanning apparatuses, it is possible to reduce the number of members of the apparatus while maintaining image quality thereof and to reduce a production cost thereof as a result.

According to another aspect of the present invention, there is provided an image forming apparatus for forming a multi-color image by superimposing and fixing toner images on a recording medium, the toner images being formed based on latent images of each color obtained from information on a multicolor image, the image forming apparatus comprising: one of the above-mentioned optical scanning apparatuses, and a plurality of photoconductors in which a latent image for each color is formed by the optical scanning apparatus, wherein the plural luminous sources correspond to the plural photoconductors and the imaging optical system of the optical scanning apparatus forms images of light beams from the plural luminous sources on a scanning surface of the corresponding photoconductors.

In accordance with this, since the image forming apparatus includes one of the above-mentioned optical scanning apparatuses, it is possible to reduce the number of members of the apparatus while maintaining image quality thereof and to reduce a production cost thereof as a result.

Other objects, features and advantage of the present invention will become more apparent from the following detailed description when read in conjunction with the accompanying drawings.

BRIEF DESCRIPTION OF THE DRAWINGS

FIG. 3 is a diagram describing a (first) method for detecting positional displacement using a positional displacement detector in FIG. 1;

DETAILED DESCRIPTION OF THE PREFERRED EMBODIMENTS

Figure 1:
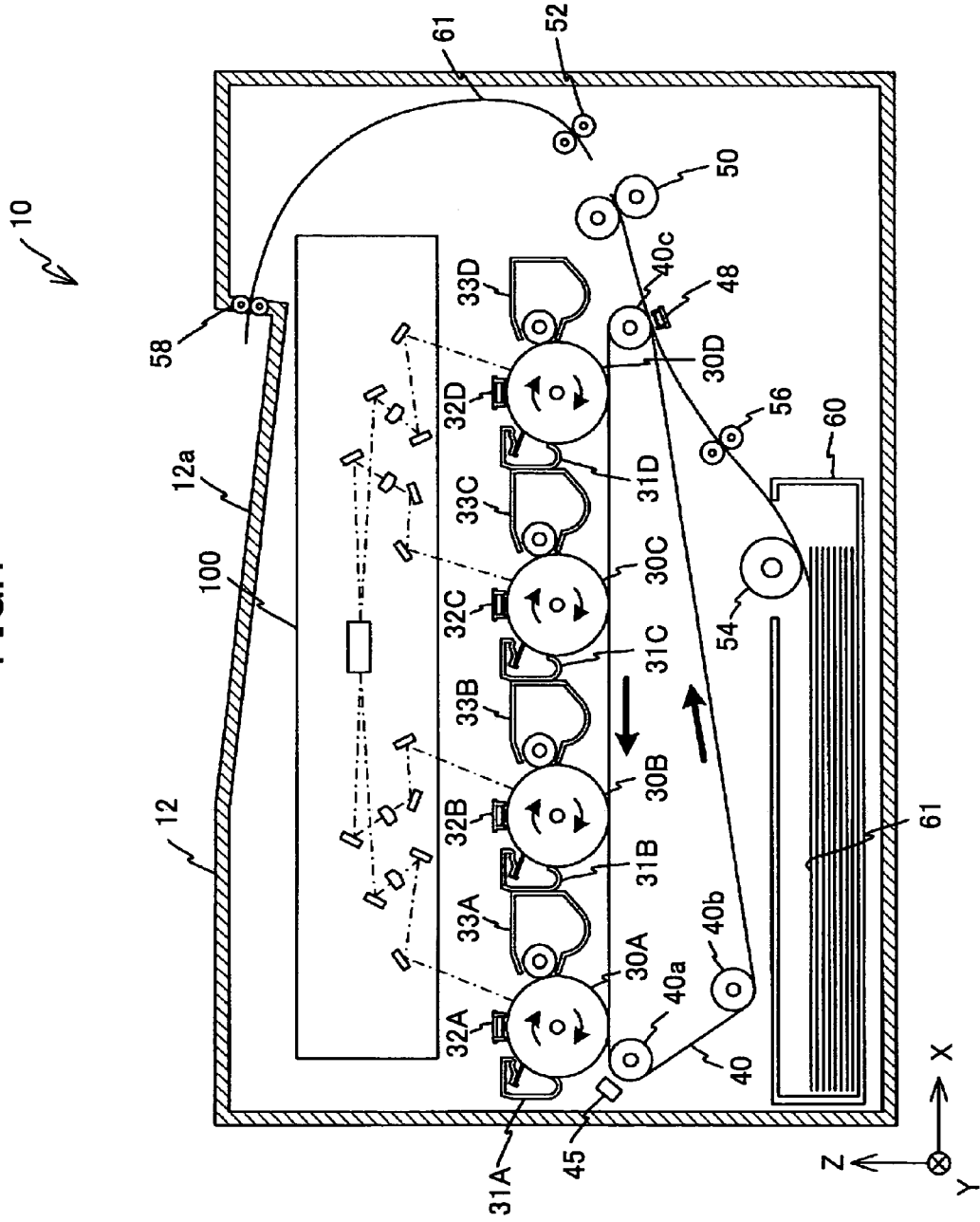
FIG. 1 is a diagram showing a printer according to an embodiment of the present invention.

In the following, an embodiment of the present invention will be described with reference to FIGS. 1 to 14. FIG. 1 is a diagram showing a schematic construction of a printer 10 as an image forming apparatus according to an embodiment of the present invention.

The printer 10 is a tandem-type color printer using the Carlson process, in which black, yellow, magenta, and cyan toner images are superimposed and transferred on plain paper (paper), thereby printing multicolor images. As shown in FIG. 1, the printer 10 includes an optical scanning apparatus 100, four photoconductor drums 30A, 30B, 30C, and 30D, a transfer belt 40, a positional displacement detector 45, a paper feed tray 60, a paper feed roller 54, a first pair of resist rollers 56, a second pair of resist rollers 52, a fuser roller 50, a paper ejecting roller 58, a substantially cuboid housing 12 for housing the above-mentioned members, and the like.

The housing 12 includes a paper ejection tray 12a formed on an upper surface thereof where paper is ejected after printing is ended and an optical scanning apparatus 100 disposed below the paper ejection tray 12a.

The optical scanning apparatus 100 scans a light beam of black image elements on the photoconductor drum 30A, the black image elements being modulated based on image information supplied from a higher-level device (personal computer, for example). In the same manner, the optical scanning apparatus 100 scans a light beam of cyan image elements on the photoconductor drum 30B, a light beam of magenta image elements on the photoconductor drum 30C, and a light beam of yellow image elements on the photoconductor drum 30D. A construction of the optical scanning apparatus 100 will be described in the following.

The four photoconductor drums 30A, 30B, 30C, and 30D include a columnar member having a photosensitive layer formed on a surface thereof, the photosensitive layer having the properties such that when a light beam is irradiated thereon, a portion irradiated with the light beam becomes conductive. The four photoconductor drums 30A, 30B, 30C, and 30D are arranged at regular intervals along an X axis direction below the optical scanning apparatus 100.

The photoconductor drum 30A is disposed at an end portion of a −X side in a Y direction as a longitudinal direction inside the housing 12 and configured to be rotated in the clockwise direction in FIG. 1 (direction indicated by arrows in FIG. 1) by a rotation mechanism not shown in the drawings. An electrification charger 32A is disposed at the 12 o'clock (upper) position in FIG. 1, a toner cartridge 33A is disposed at the 2 o'clock position, and a cleaning case 31A is disposed at the 10 o'clock position around the photoconductor drum 30A.

The electrification charger 32A is disposed on the surface of the photoconductor drum 30A in the Y direction as a longitudinal direction thereof via a predetermined clearance and electrifies the surface of the photoconductor drum 30A with a predetermined voltage.

The toner cartridge 33A includes a cartridge body filled with toner for black image elements, a development roller electrified with voltage having a polarity opposite to that of the photoconductor drum 30A, and the like. The toner cartridge 33A supplies the toner filled in the cartridge body to the surface of the photoconductor drum 30A via the development roller.

The cleaning case 31A includes a rectangular cleaning blade in the Y direction as a longitudinal direction thereof and is disposed such that an edge of the cleaning blade is brought into contact with the surface of the photoconductor drum 30A. The toner attracted on the surface of the photoconductor drum 30A is separated by the cleaning blade in accordance with the rotation of the photoconductor drum 30A and is collected in the cleaning case 31A.

The photoconductor drum 30B is disposed on a +X side of the photoconductor drum 30A at a predetermined distance therefrom and configured to be rotated in the clockwise direction in FIG. 1 (direction indicated by arrows in FIG. 1) by a rotation mechanism not shown in the drawings. In the same manner as in the positional relationship of the above-mentioned photoconductor drum 30A, an electrification charger 32B, a toner cartridge 33B, and a cleaning case 31B are disposed around the photoconductor drum 30B.

The electrification charger 32B is configured in the same manner as in the above-mentioned electrification charger 32A and electrifies the surface of the photoconductor drum 30B with a predetermined voltage.

The toner cartridge 33B includes a cartridge body filled with toner for cyan image elements, a development roller electrified with voltage having a polarity opposite to that of the photoconductor drum 30B, and the like. The toner cartridge 33B supplies the toner filled in the cartridge body to the surface of the photoconductor drum 30B via the development roller.

The cleaning case 31B is configured and functions in the same manner as in the cleaning case 31A.

The photoconductor drum 30C is disposed on a +X side of the photoconductor drum 30B at a predetermined distance therefrom and configured to be rotated in the clockwise direction in FIG. 1 (direction indicated by arrows in FIG. 1) by a rotation mechanism not shown in the drawings. In the same manner as in the positional relationship of the above-mentioned photoconductor drum 30A, an electrification charger 32C, a toner cartridge 33C, and a cleaning case 31C are disposed around the photoconductor drum 30C.

The electrification charger 32C is configured in the same manner as in the above-mentioned electrification charger 32A and electrifies the surface of the photoconductor drum 30C with a predetermined voltage.

The toner cartridge 33C includes a cartridge body filled with toner for magenta image elements, a development roller electrified with voltage having a polarity opposite to that of the photoconductor drum 30C, and the like. The toner cartridge 33C supplies the toner filled in the cartridge body to the surface of the photoconductor drum 30C via the development roller.

The cleaning case 31C is configured and functions in the same manner as in the cleaning case 31A.

The photoconductor drum 30D is disposed on a +X side of the photoconductor drum 30C at a predetermined distance therefrom and configured to be rotated in the clockwise direction in FIG. 1 (direction indicated by arrows in FIG. 1) by a rotation mechanism not shown in the drawings. In the same manner as in the positional relationship of the above-mentioned photoconductor drum 30A, an electrification charger 32D, a toner cartridge 33D, and a cleaning case 31D are disposed around the photoconductor drum 30D.

The electrification charger 32D is configured in the same manner as in the above-mentioned electrification charger 32A and electrifies the surface of the photoconductor drum 30D with a predetermined voltage.

The toner cartridge 33D includes a cartridge body filled with toner for yellow image elements, a development roller electrified with voltage having a polarity opposite to that of the photoconductor drum 30D, and the like. The toner cartridge 33D supplies the toner filled in the cartridge body to the surface of the photoconductor drum 30D via the development roller.

The cleaning case 31D is configured and functions in the same manner as in the cleaning case 31A.

In the following, the photoconductor drum 30A, electrification charger 32A, toner cartridge 33A, and cleaning case 31A are collectively referred to as a first station. Also, the photoconductor drum 30B, electrification charger 32B, toner cartridge 33B, and cleaning case 31B are collectively referred to as a second station. The photoconductor drum 30C, electrification charger 32C, toner cartridge 33C, and cleaning case 31C are collectively referred to as a third station. And the photoconductor drum 30D, electrification charger 32D, toner cartridge 33D, and cleaning case 31D are collectively referred to as a fourth station.

The transfer belt 40 is made of an endless loop member and is wound around a driven roller 40a disposed below the photoconductor drum 30A, a driven roller 40c disposed below the photoconductor drum 30D, and a driving roller 40b disposed at a slightly lower position relative to the driven rollers 40a and 40c, such that a top surface of the transfer belt 40 is brought into contact with each lower end surface of the photoconductor drums 30A, 30B, 30C, and 30D. When the driving roller 40b rotates in the counterclockwise direction in FIG. 1, the transfer belt 40 is rotated in the counterclockwise direction (direction indicated by arrows in FIG. 1). In the vicinity of an end portion of a +X side of the transfer belt 40, a transfer charger 48 is disposed, the transfer charger 48 being provided with voltage having a polarity opposite to that of the above-mentioned electrification chargers 32A, 32B, 32C, and 32D.

Figure 2:
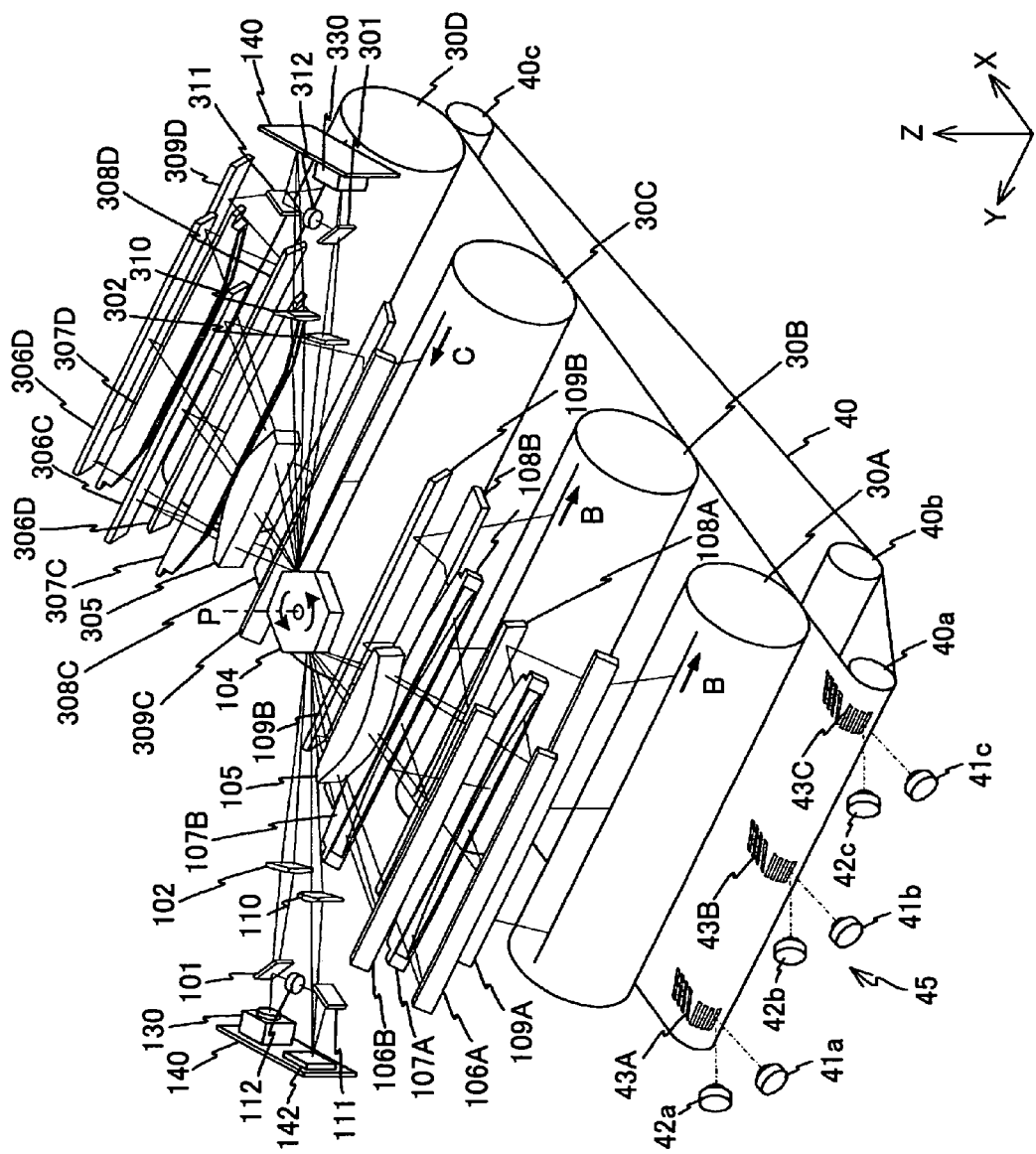
FIG. 2 is a perspective view showing an optical scanning apparatus of the printer in FIG. 1.

The positional displacement detector 45 is disposed on a −X side of the transfer belt 40. With reference to FIG. 1 and FIG. 2, the positional displacement detector 45 includes an LED 42a for illuminating an end portion of a +Y side of the transfer belt 40 and a photo sensor 41a for receiving a reflected light thereof, an LED 42b for illuminating a central portion of the transfer belt 40 and a photo sensor 41b for receiving a reflected light thereof, and an LED 42c for illuminating an end portion of a −Y side of the transfer belt 40 and a photo sensor 41c for receiving a reflected light thereof.

As shown in FIG. 2, the LEDs 42a, 42b, and 42c illuminate detection patterns 43A, 43B, and 43C of toner images formed along a Y axis direction on the transfer belt 40, respectively. As will be described in the following, the positional displacement detector 45 detects resist and magnification in the Y axis direction and resist and inclination in the X axis direction as relative positional displacement using patterns of a toner image as a standard formed in the first station, on the basis of time difference of detection signals, for example, obtained by receiving reflected light using the photo sensors 41a, 41b, and 41c. The relative positional displacement from the first station is detected so as to control the optical scanning apparatus 100 described in the following such that a toner image formed in other station is superimposed on the toner image in the first station when toner images formed in each station are superimposed.

In the following, a method for detecting the resist and magnification in the Y axis direction and the resist and inclination in the X axis direction are briefly described with reference to FIG. 3. FIG. 3 is plan view showing detection time difference. In the figure, $t_y$, $t_1$, $t_2$, $t_3$, and the like, indicate a difference in detection time when line patterns described in the following are detected by the photo sensors 41a 41b, 41c, and the like.

Each of the detection patterns 43A, 43B, and 43C is made of four line patterns Y, M, C, and K parallel to the Y axis and four line patterns Y', M', C', and K' at 45 degrees relative to the Y axis as shown in the detection patterns 43C. The line patterns Y and Y' are transferred in the fourth station, the line patterns M and M' are transferred in the third station, the line patterns C and C' are transferred in the second station, and the line patterns K and K' are transferred in the first station.

When the detection patterns 43A, 43B, and 43C are formed on the transfer belt 40, the detection patterns are moved in the −X direction in accordance with the driving of the transfer belt 40. Then, the detection patterns 43A, 43B, and 43C are illuminated by the LEDs 42a, 42b, and 42c and reflected light thereof is received by the photo sensors 41a, 41b, and 41c, respectively.

In this case, if positional displacement is generated between the detection patterns 43A and 43C in the X axis direction as shown in FIG. 3, there is a difference of time $t_y$ between time when the line pattern Y of the detection patterns 43A is detected and time when the line pattern Y of the detection patterns 43C is detected. Thus, it is possible to detect inclination of the toner image formed in the fourth station based on the time $t_y$ and the speed of the transfer belt. In the same manner, it is possible to detect inclination of toner images formed in the first to fourth stations by performing the same processing on the other line patterns M, C, and K of the detection patterns 43A and 43C. Information on the inclination of each pattern is supplied to the optical scanning apparatus 100 described in the following and correction is performed based on the patterns formed in the first station.

Further, it is possible to detect positional displacement of the line patterns Y, M, and C in the X axis direction based on the line pattern K of the first station by measuring time $t_1$, $t_2$, and $t_3$ from when the line pattern Y of the detection patterns 43B is detected until when other line patterns M, C, and K are detected. For example, when no positional displacement is generated in the X axis direction, the time $t_2$ is twice the length of the time $t_1$, and the time $t_3$ is three times the length of the time $t_1$. However, when positional displacement is generated, the above-mentioned relationship is not obtained, so that it is possible to detect the positional displacement of the line patterns Y, M, and C in the X axis direction from the relationship with the time $t_1$, $t_2$, and $t_3$ based on the line pattern K. Information on the positional displacement detected in the X direction is supplied to the optical scanning apparatus 100 described in the following and correction is performed based on the information on the positional displacement.

Figure 4A:
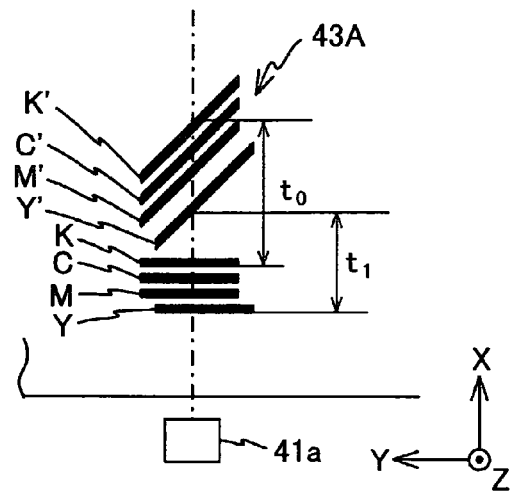
FIG. 4A is a diagram describing a (second) method for detecting positional displacement using the positional displacement detector in FIG. 1.

In the detection patterns 43A, if there is no positional displacement in the Y direction between the line patterns Y and Y', M and M', C and C', and K and K', the same length of time is measured in time from when the line pattern Y is detected until when the line pattern Y' is detected, time from when the line pattern M is detected until when the line pattern M' is detected, time from when the line pattern C is detected until when the line pattern C' is detected, and time from when the line pattern K is detected until when the line pattern K' is detected. However, as shown in FIG. 4A, if the line patterns Y and Y' are displaced in the −Y direction relative to the line patterns K and K', when detection time $t_0$ concerning the line patterns K and K' is compared with the detection time $t_1$ concerning the line patterns Y and Y', the time $t_1$ is smaller than the time $t_0$. By contrast, if the line patterns Y and Y' are displaced in the +Y direction, the time $t_1$ is greater than the time $t_0$. Thus, by comparing the time $t_0$ with the time $t_1$, it is possible to detect relative positional displacement of the line patterns Y and Y' in the Y axis direction relative to the line patterns K and K', the line patterns Y and Y' being formed in the fourth station and the line patterns K and K' being formed in the first station. Also, by performing the same processing on the line patterns M and M' and C and C', it is possible to detect relative positional displacement of the line patters M and M' and C and C' in the Y axis direction relative to the line patterns K and K', the line patters M and M' and C and C' being formed in the third and second stations, respectively, and the line patterns K and K' being formed in the first station.

In the same manner, in the detection patterns 43B and 43C, it is possible to detect relative positional displacement of the line patterns C and C', M and M', and Y and Y' in the Y axis direction relative to the line patterns K and K', the line patterns C and C', M and M', and Y and Y' being formed in the second to fourth stations, respectively, and the line patterns K and K' being formed in the first station.

Figure 4B:
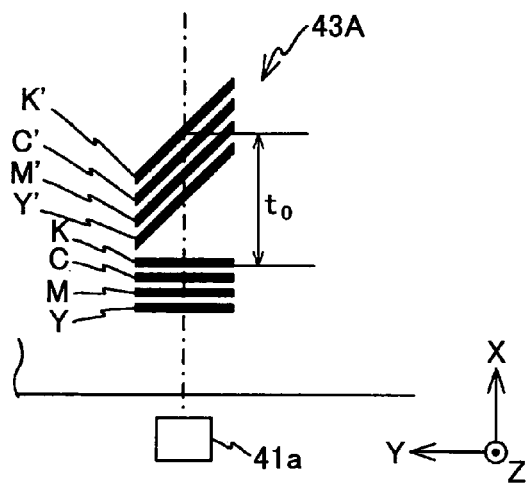
FIG. 4B is a diagram describing a (third) method for detecting positional displacement using the positional displacement detector in FIG. 1.
Figure 4C:
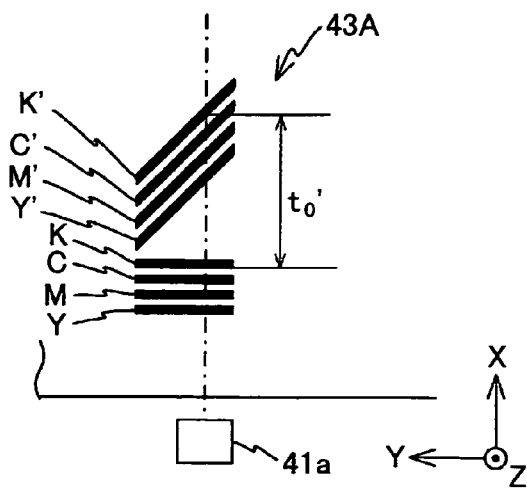
FIG. 4C is a diagram describing a (fourth) method for detecting positional displacement using the positional displacement detector in FIG. 1.

As shown in FIG. 4B, when a position of the photo sensor 41a in the Y axis is used as a base position, the base position corresponds to a position of the detection patterns 43A, and detection time concerning the line patterns K and K' is to, detection time $t_0'$ concerning the line patterns K and K' when the line patters 43A are displaced in the +Y direction is greater than the time $t_0$. By contrast, the detection time $t_0'$ concerning the line patterns K and K' is smaller than the time $t_0$ when the line patters 43A are displaced in the −Y direction. Thus, by comparing the detection time $t_0$ with $t_1$, it is possible to detect absolute positional displacement of the detection patterns 43A in the Y axis direction. Also, it is possible to detect absolute positional displacement of the detection patterns 43C in the Y axis direction by performing the same processing on the detection patterns 43C.

Information on the above-mentioned positional displacement in the Y axis direction is supplied to the optical scanning apparatus 100 described in the following and correction is performed by the optical scanning apparatus 100 based on the line patterns K and K.

In addition, the construction of the positional displacement detector 45 is disclosed in Japanese Patent No. 3644923 and is well known, so that description thereof is omitted.

With reference to FIG. 1, the paper feed tray 60 is disposed below the transfer belt 40. The paper feed tray 60 is a substantially cuboid tray in which plural sheets of paper 61 are piled and stored as printing objects. The paper feed tray 60 has a rectangular paper feed opening in the vicinity of an end on a +X side of an upper surface thereof.

The paper feed roller 54 takes out a sheet of the paper 61 at one time from the paper feed tray 60 and guides the paper 61 via the first pair of resist rollers 56 made of a pair of rollers to a space formed between the transfer belt 40 and the transfer charger 48.

The fuser roller 50 is made of a pair of rollers. The fuser roller 50 heats the paper 61, applies pressure thereto, and then guides the paper 61 to the paper ejecting roller 58 via the second pair of resist rollers 52.

The paper ejecting roller 58 is made of a pair of rollers. The paper ejecting roller 58 sequentially stacks the guided paper 61 on the paper ejection tray 12a.

Figure 5:
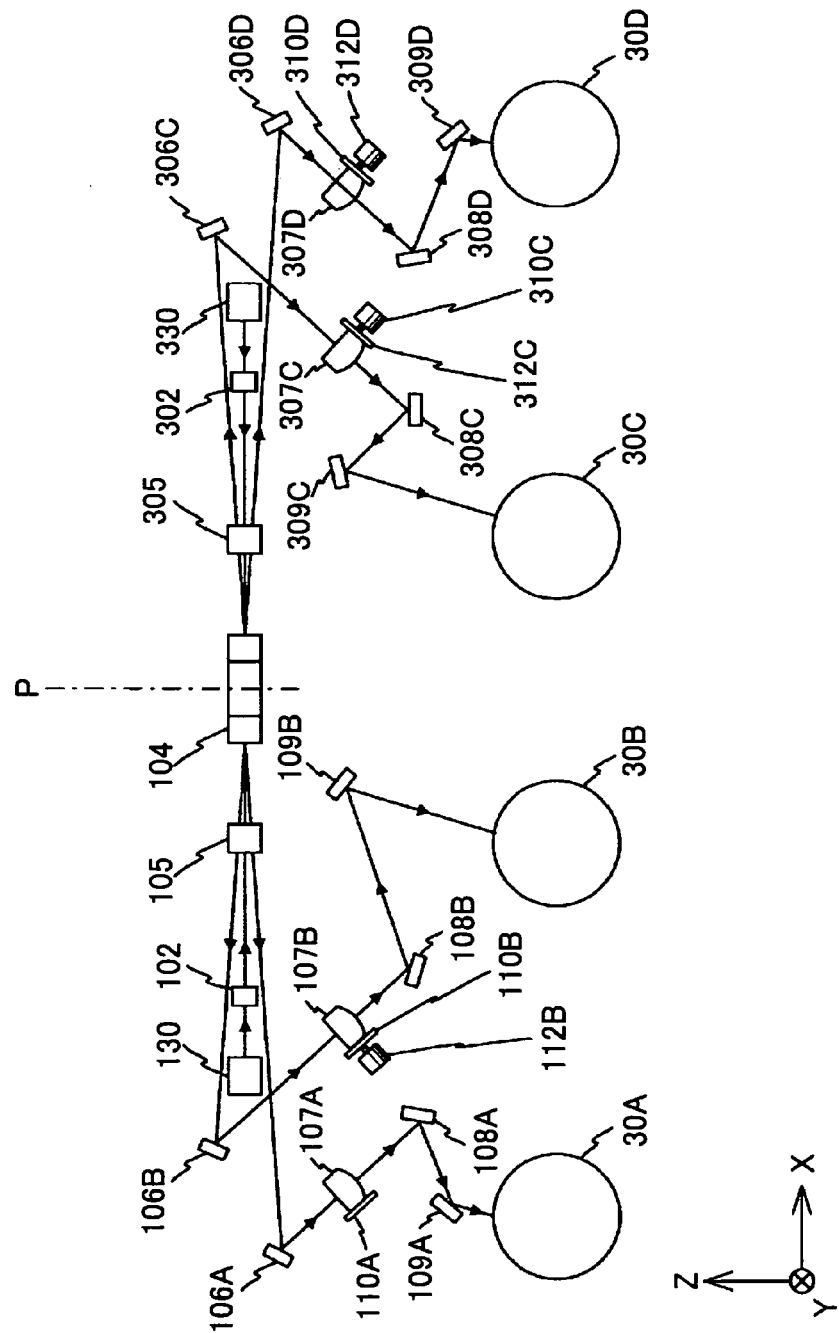
FIG. 5 is a side view showing the optical scanning apparatus of the printer in FIG. 1.

Next, the construction of the optical scanning apparatus 100 is described. With reference to FIGS. 2 and 5, the optical scanning apparatus 100 includes a polygon mirror 104, an fθ lens 105, a reflecting mirror 106B, and a reflecting mirror 106A disposed successively in a −X direction relative to the polygon mirror 104, the toroidal lens 107A disposed below the reflecting mirror 106A, a toroidal lens 107B and a reflecting mirror 109B disposed successively in a +X direction relative to the toroidal lens 107A, a reflecting mirror 109A disposed below the toroidal lens 107A, and a reflecting mirror 108A and a reflecting mirror 108B disposed in a +X direction relative to the reflecting mirror 109A. Also, the optical scanning apparatus 100 includes an fθ lens 305, a reflecting mirror 306C, and a reflecting mirror 306D disposed successively in a +X direction relative to the polygon mirror 104, a toroidal lens 307D disposed below the reflecting mirror 306D, a toroidal lens 307C and a reflecting mirror 309C disposed successively in a −X direction relative to the toroidal lens 307D, a reflecting mirror 309D disposed below the toroidal lens 307D, and a reflecting mirror 308D and a reflecting mirror 308C disposed in a −X direction relative to the reflecting mirror 309D. Moreover, the optical scanning apparatus 100 includes pairs of light source units 130 and 330 and cylinder lenses 102 and 302 disposed on a line at a predetermined degree θ relative to the X axis such that the polygon mirror 104 is positioned therebetween. The optical scanning apparatus 100 further includes a condenser lens 110 disposed in the vicinity of the cylinder lens 102, a condenser lens 310 disposed in the vicinity of the cylinder lens 302, a half mirror 101, a reflecting mirror 111, a condenser lens 112, and a light receiving element 142 disposed in the vicinity of the light source unit 130, and a half mirror 301, a reflecting mirror 311, a condenser lens 312, and the light receiving element 142 disposed in the vicinity of the light source unit 330, for example.

In this case, a coordinate system determined by rotating the xy coordinates by θ degrees relative to a Z axis as a center thereof is used as xy coordinates and the coordinates are used where necessary in the following.

Figure 6:
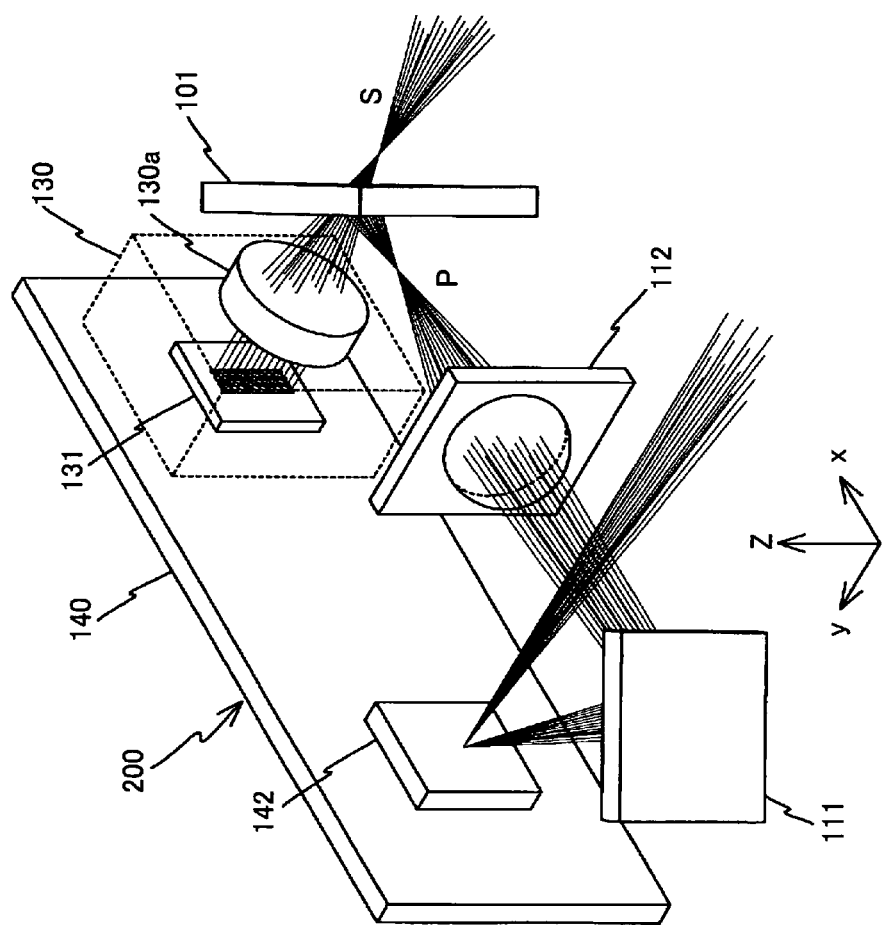
FIG. 6 is a perspective view showing the vicinity of a light source unit in FIG. 2.

FIG. 6 shows the vicinity of the light source unit 130. As shown in FIG. 6, the light source unit 130 is mounted in the vicinity of an end of the +X side of a surface on the −y side of the substrate 140 having a rectangular plate in the X axis direction as a longitudinal direction thereof. The light source unit 130 includes a cuboid casing 130, the laser array 131, and a coupling lens 130a.

The casing 130 has a cuboid shape, in which a circular opening is formed on the surface of the −y side thereof and the coupling lens 130a is fit in the opening without forming clearance therebetween.

Figure 7:
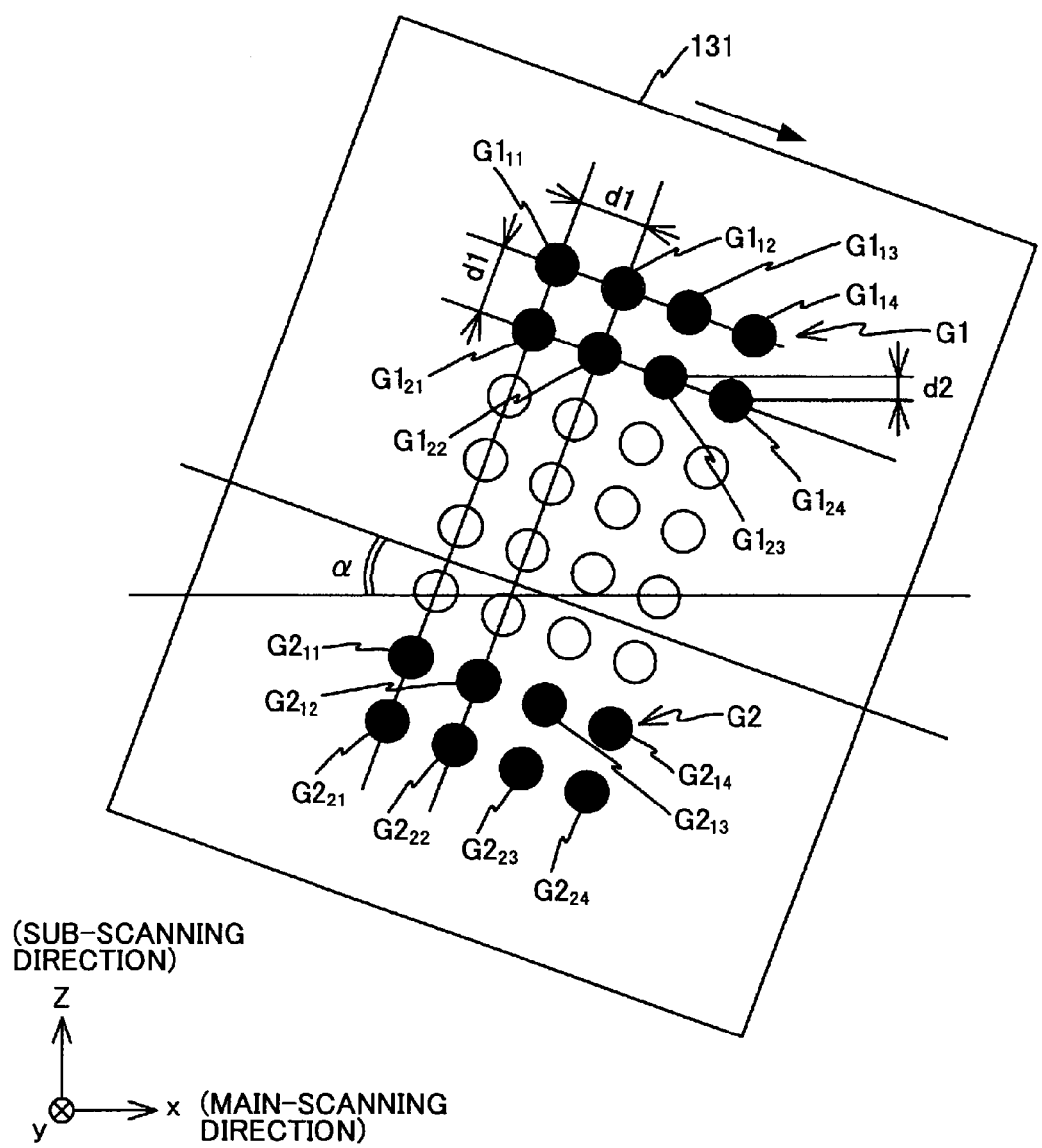
FIG. 7 is a plan view showing a laser array in FIG. 6.

The laser array 131 is a laser array in which luminous sources are two-dimensionally arranged, such as Edge Emitting Laser, Vertical Cavity Surface Emitting Laser, and the like. The laser array 131 is fixed on an inner wall of the +y side of the inside of the casing 130 in a status such that an optical axis of the coupling lens 130a corresponds to that of the laser array 131, the laser array 131 being rotated by a tilt angle of α relative to the Y axis as a center thereof (in the clockwise direction when viewed from the front). As shown in FIG. 7, in the laser array 131, 32 luminous sources are arranged in an 8-by-4 matrix on the −y side thereof having a row space and a column space of d1. A deflection direction of each luminous source is set in an arrow direction (row direction) in FIG. 7, for example. In the present embodiment, multi-beam light sources for driving the light sources are employed in first and second rows, and seventh and eighth rows indicated by black circles among the 32 luminous sources. Other luminous sources are used as dummy light sources.

In this case, when the magnification of an optical system in a sub-scanning direction is Ms, the tilt angle of α is represented by the following formula (1):

$$\alpha = \sin^{-1}(2 \cdot d1 \cdot Ms) \tag{1}$$

By fixing the laser array 131 at the tilt angle of α determined from the above-mentioned formula (1), the eight luminous sources in the first and second rows and the eight luminous sources in the seventh and eighth rows are arranged with a pitch of d2 therebetween in the sub-scanning direction such that the pitch of light beam spots of the photoconductor drums 30A and 30B in the sub-scanning direction is equal to a scanning line pitch corresponding to recording density.

The eight luminous sources arranged in the first and second rows are referred to as a first luminous source group G1. The eight luminous sources arranged in the seventh and eighth rows are referred to as a second luminous source group G2. The luminous sources constituting the first luminous source group G1 are referred to as a luminous source $G1_{11}$, luminous source $G1_{12}$, luminous source $G1_{13}$, and luminous source $G1_{14}$, sequentially from a first column of the first row, and as a luminous source $G1_{21}$, luminous source $G1_{22}$, luminous source $G1_{23}$, and luminous source $G1_{24}$, sequentially from a first column of the second row. The luminous sources constituting the second luminous source group G2 are referred to as a luminous source $G2_{11}$, luminous source $G2_{12}$, luminous source $G2_{13}$, and luminous source $G2_{14}$, sequentially from a first column of the seventh row, and as a luminous source $G2_{21}$, luminous source $G2_{22}$, luminous source $G2_{23}$, and luminous source $G2_{24}$, sequentially from a first column of the eighth row.

In addition, each luminous source may be formed in a step of processing the laser array 131 such that the row direction of the luminous sources forms an angle of α relative to the main scanning direction and the column direction thereof corresponds to the sub-scanning direction, instead of fixing the laser array 131 at the tilt angle of α.

With reference to FIG. 6, the light receiving element 142 is mounted in the vicinity of an end of the −x side of the surface on the −y side of the substrate 140. The light receiving element 142 outputs a voltage signal, for example, in accordance with the intensity of a received light beam.

The half mirror 101 is disposed on the −y side of the light source unit 130. The half mirror 101 allows a light beam emitted from the laser array 131 via the coupling lens 130a to pass through and splits a portion of the light beam in the −x direction. As mentioned above, the laser array 131 has the tilt angle of α, so that the light beam has component of P-polarized light and component of S-polarized light regarding the half mirror 101. In this case, the half mirror 101 splits the component of P-polarized light of the light beam in the −x direction.

The condenser lens 112 condenses the light beam in the light receiving element 142 via the reflecting mirror 111, the light beam being split by the half mirror 101.

With reference to FIGS. 2 and 5, the cylinder lens 102 is fixed on the housing 12 of the printer 10 via a supporting member not shown in the drawings and condenses the light beam emitted from the light source unit 130 on a deflection surface of the polygon mirror 104.

The condenser lens 110 condenses the light beam from the polygon mirror 104 on the light receiving element 142.

The light source unit 330 is mounted in the vicinity of an end of the +x side of the surface of the −y side of the substrate 140 having a rectangular plate in the X axis direction as a longitudinal direction thereof. The light source unit 330 has the same configuration as that of the light source unit 130.

The light receiving element 142 is mounted in the vicinity of an end of the +x side of a surface on the +y side of the substrate 140. The light receiving element 142 outputs a signal in accordance with the intensity of a received light beam.

The half mirror 301 is disposed on the +y side of the light source unit 330. The half mirror 301 allows a light beam emitted from the light source unit 330 to pass through and splits a portion of the light beam in the +x direction. In this case, the half mirror 301 splits the light beam into component of P-polarized light in the +x direction.

The condenser lens 312 condenses the light beam split by the half mirror 343 on the light receiving element 142 via the reflecting mirror 311.

The cylinder lens 302 is fixed on the housing 12 of the printer 10 via a supporting member not shown in the drawings and condenses the light beam emitted from the light source unit 330 on a deflection surface of the polygon mirror 104.

The condenser lens 310 condenses the light beam from the polygon mirror 104 on the light receiving element 142.

The polygon mirror 104 is made of a hexagonal columnar member with a low height, in which six deflection surfaces are formed on sides thereof. The polygon mirror 104 is rotated by a rotation mechanism in a direction indicated by arrows in FIG. 2 at a fixed angular velocity relative to an axis P parallel with the Z axis as a center thereof. Thus, the light beam emitted from the light source units 130 and 330 and condensed on the deflection surfaces of the polygon mirror 104 is deflected in accordance with the rotation of the polygon mirror 104 along the Y axis at a fixed angular velocity.

The fθ lenses 105 and 305 have an image height in accordance with the incident angle of the light beam. The fθ lenses 105 and 305 move an image surface of the light beam at a constant speed relative to the Y axis, the light beam being deflected by the polygon mirror 104 at the fixed angular velocity.

The reflecting mirrors 106A, 106B, 306C, and 306D are disposed in the Y axis direction as a longitudinal direction thereof. The reflecting mirrors 106A, 106B, 306C, and 306D reflect the light beam transmitted via the fθ lenses 105 and 305 and guide the light beam to the toroidal lenses 107A, 107B, 307C, and 307D.

Figure 8A:
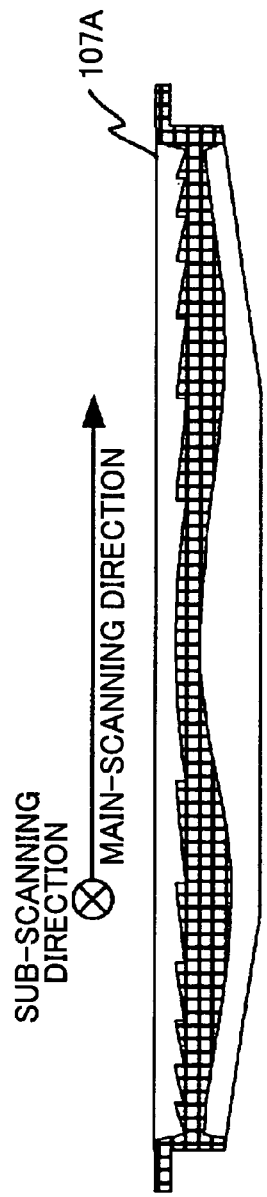
FIG. 8 is a diagram showing a diffraction plane of a toroidal lens.
Figure 8B:
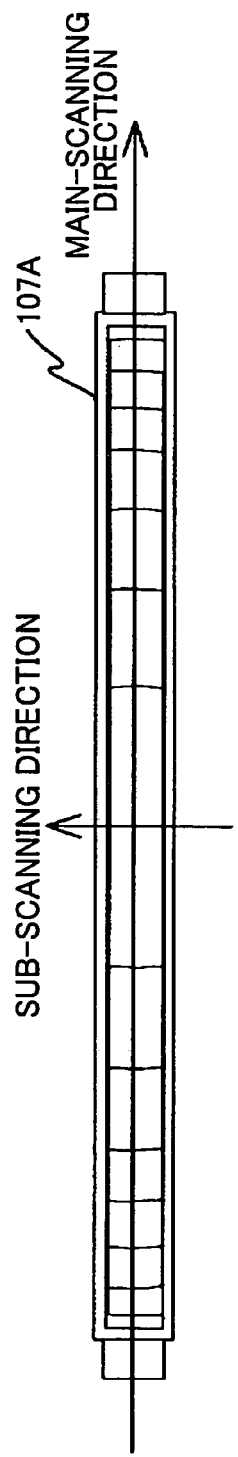

The toroidal lens 107A is stably supported by a supporting plate 110A having both ends thereof fixed on the housing 12 in the Y axis direction as a longitudinal direction thereof. The toroidal lens 107A forms an image of the light beam on the surface of the photoconductor drum 30A via the reflecting mirrors 108A and 109A in the Y direction as a longitudinal direction thereof, the light beam being reflected on the reflecting mirror 106A. As shown in FIG. 8A and FIG. 8B, the toroidal lens 107A includes a Fresnel diffraction plane formed on a surface where the light beam enters, the diffraction plane being made of a saw-toothed diffraction grating. The diffraction plane has power (refracting power) so as to correct a focus change in the main scanning direction resulting from a difference of wavelength of the light beams emitted from each luminous source. And, the diffraction plane is configured such that a ratio of the refracting power to power from diffraction is constant from the optical axis to the outside of the optical axis. In the present embodiment, power of a scanning optical system is positive, so that when the wavelength is increased, refracting power is reduced and the focus is off. Thus, in the diffraction plane, diffraction power is set in a direction opposite to the focus movement.

The toroidal lenses 107B, 307C, 307D are configured in the same manner as in the toroidal lens 107A. One ends (+y side) thereof are fixed on the housing 12 in the Y axis direction as a longitudinal direction thereof and other ends (−y side) thereof are stably supported by supporting plates 110B, 312C, 310D supported by driving mechanisms 112B, 310C, and 312D (not shown in FIG. 2, refer to FIG. 5). The toroidal lenses 107B, 307C, 307D form images of the light beam on the surfaces of the photoconductor drums 30B, 30C, and 30D via the reflecting mirrors 108B, 109B, 308C, 309C, 308D, and 309D, the light beam being reflected on the reflecting mirrors 106B, 306C, and 306D.

Figure 9A:
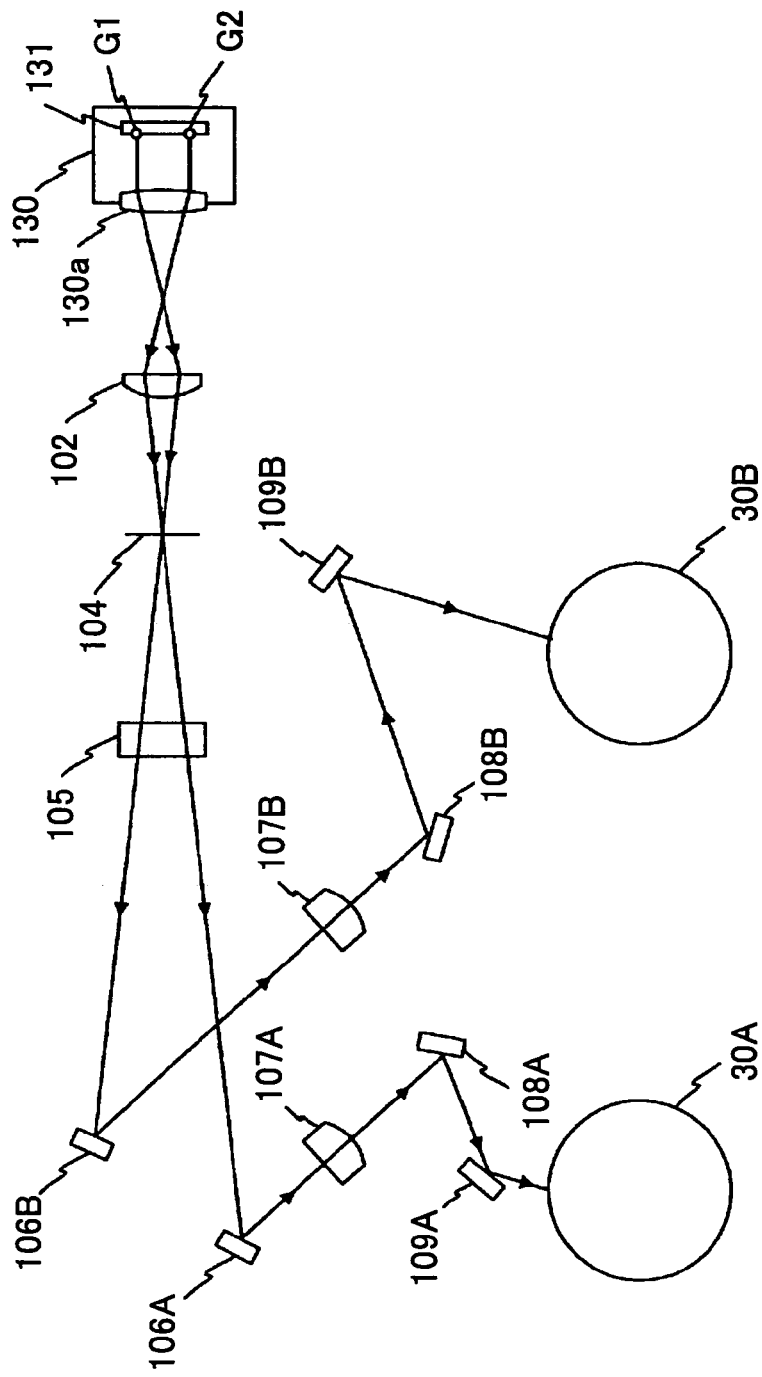
FIG. 9 is a diagram showing an optical layout of the optical scanning apparatus.
Figure 9B:
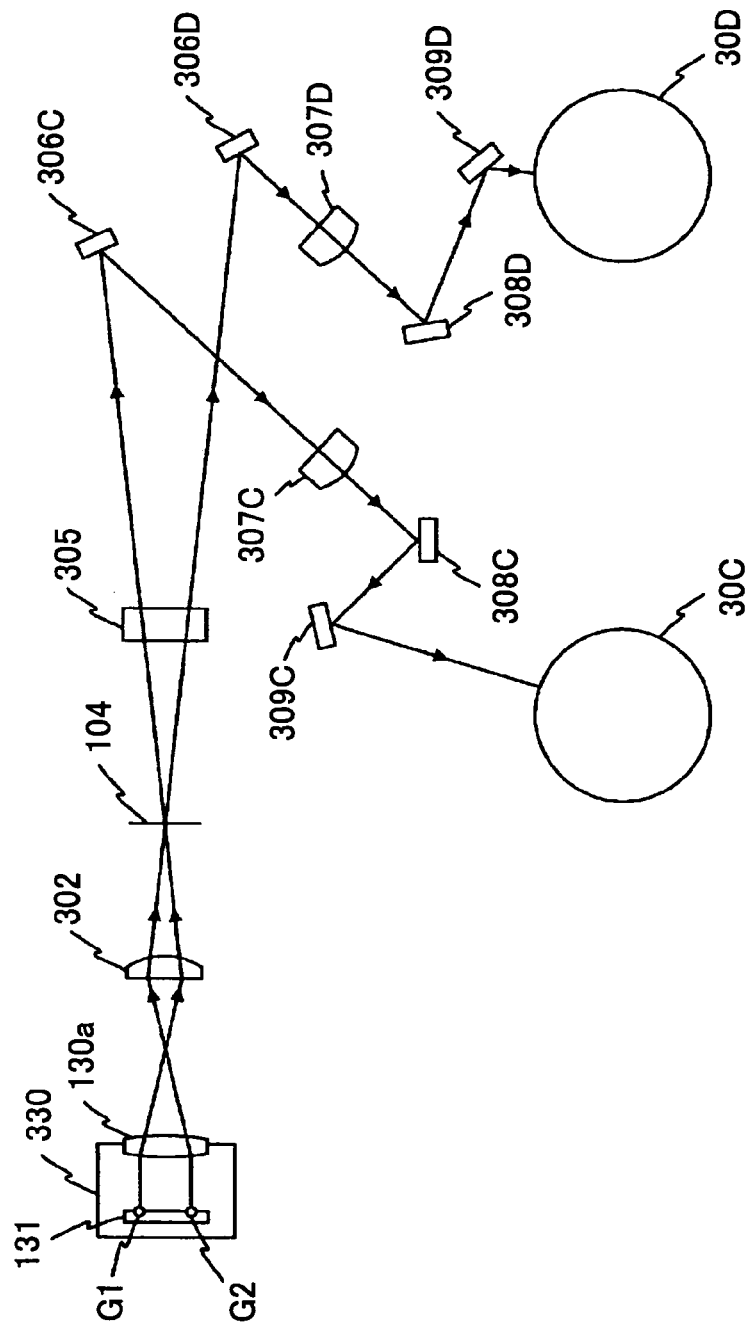

An optical path of the light beam of the optical scanning apparatus 100 constructed in the above-mentioned manner can be represented in an optical layout as shown in FIG. 9A and FIG. 9B.

In the following, an operation of the optical scanning apparatus 100 and the Carlson process are described with reference to FIG. 9A and FIG. 9B. As shown in FIG. 9A, plural light beams emitted from the luminous source groups G1 and G2 of the light source unit 130 are crossed in the coupling lens 130a and enter the cylinder lens 102. The cylinder lens 102 condenses the light beams from the luminous source groups G1 and G2 in the vicinity of the deflection surface of the polygon mirror 104. The light beams deflected on the polygon mirror 104 enter the fθ lens 105 while increasing a space among the light beams The light beams from the luminous source group G1 after entering the fθ lens 105 are reflected on the reflecting mirror 106B and enter the toroidal lens 107B. Then, the light beams are condensed on the surface of the photoconductor drum 30B by the toroidal lens 107B via the reflecting mirrors 108B and 109B.

The light beams from the luminous source group G2 after entering the fθ lens 105 are reflected on the reflecting mirror 106A and enter the toroidal lens 107A. Then, the light beams are condensed on the surface of the photoconductor drum 30A by the toroidal lens 107A via the reflecting mirrors 108A and 109A.

On the other hand, as shown in FIG. 9B, plural light beams emitted from the luminous source groups G1 and G2 of the light source unit 330 are crossed in the coupling lens 130a and enter the cylinder lens 302. The cylinder lens 302 condenses the light beams from the luminous source groups G1 and G2 in the vicinity of the deflection surface of the polygon mirror 104. The light beams deflected on the polygon mirror 104 enter the fθ lens 305 while increasing a space among the light beams The light beams from the luminous source group G1 after entering the fθ lens 305 are reflected on the reflecting mirror 306C and enter the toroidal lens 307C. Then, the light beams are condensed on the surface of the photoconductor drum 30C by the toroidal lens 307C via the reflecting mirrors 308C and 309C.

The light beams from the luminous source group G2 after entering the fθ lens 305 are reflected on the reflecting mirror 306D and enter the toroidal lens 307D. Then, the light beams are condensed on the surface of the photoconductor drum 30D by the toroidal lens 307D via the reflecting mirrors 308D and 309D.

In this manner, condensed points of the light beams formed on the photoconductor drums 30A and 30B are moved (scanned) together in a direction indicated by arrows B in FIG. 2 in accordance with the rotation of the polygon mirror 104, the light beams being emitted from the luminous source groups G1 and G2 of the light source unit 130. Also, condensed points of the light beams formed on the photoconductor drums 30C and 30D are moved (scanned) together in a direction indicated by an arrow C in FIG. 2 in accordance with the rotation of the polygon mirror 104, the light beams being emitted from the luminous source groups G1 and G2 of the light source unit 330.

In this case, as shown in FIG. 7, the laser array 131 of the light source unit 130 is fixed at the tilt angle of α relative to the y axis as a center thereof, so that the eight luminous sources constituting the luminous source groups G1 and G2 are substantially arranged in the sub-scanning direction at regular intervals with a space of d2 (d1·sin α) therebetween. In the same manner, the laser array 131 of the light source unit 330 is fixed at a tilt angle of −α relative to the y axis as a center thereof, so that the eight luminous sources constituting the luminous source groups G1 and G2 are substantially arranged in the sub-scanning direction at regular intervals with the space of d2 (d1·sin α) therebetween. Thus, in the photoconductor drums 30A, 30B, 30C, and 30D, eight line scanning is performed in a single scanning using the eight luminous sources.

On the other hand, in the photosensitive layers on the surfaces of the photoconductor drums 30A, 30B, 30C, and 30D, electric charge is distributed in a constant charge density by electrification at a predetermined voltage from the electrification chargers 32A, 32B, 32C, and 32D. As mentioned above, when the photoconductor drums 30A, 30B, 30C, and 30D are scanned, the photosensitive layers where the light beams are condensed have electrical conductivity, so that relevant portions experience charge transfer and electric potential thereof becomes zero. Thus, it is possible to form electrostatic latent images, defined by the distribution of electric charge, on the surfaces of the photoconductor drums 30A, 30B, 30C, and 30D each rotating in the direction of the arrows in FIG. 1 by scanning light beams modulated based on image information on the photoconductor drums 30A, 30B, 30C, and 30D.

When the electrostatic latent images are formed on the surfaces of the photoconductor drums 30A, 30B, 30C, and 30D, toner is supplied to the surfaces of the photoconductor drums 30A, 30B, 30C, and 30D by the development rollers of the toner cartridges 33A, 33B, 33C, and 33D shown in FIG. 1. In this case, the development rollers of the toner cartridges 33A, 33B, 33C, and 33D are electrified with voltage having a polarity opposite to that of the photoconductor drums 30A, 30B, 30C, and 30D, so that the toner attached to the development rollers is electrified to have the same polarity as that of the photoconductor drums 30A, 30B, 30C, and 30D. Thus, on the surfaces of the photoconductor drums 30A, 30B, 30C, and 30D, the toner is not attached to portions where the electric charge is distributed and the toner is attached only to scanned portions, thereby forming toner images on the surfaces of the photoconductor drums 30A, 30B, 30C, and 30D where the electrostatic latent images are visualized. Then, the toner images are transferred to the transfer belt 40.

Figure 10:
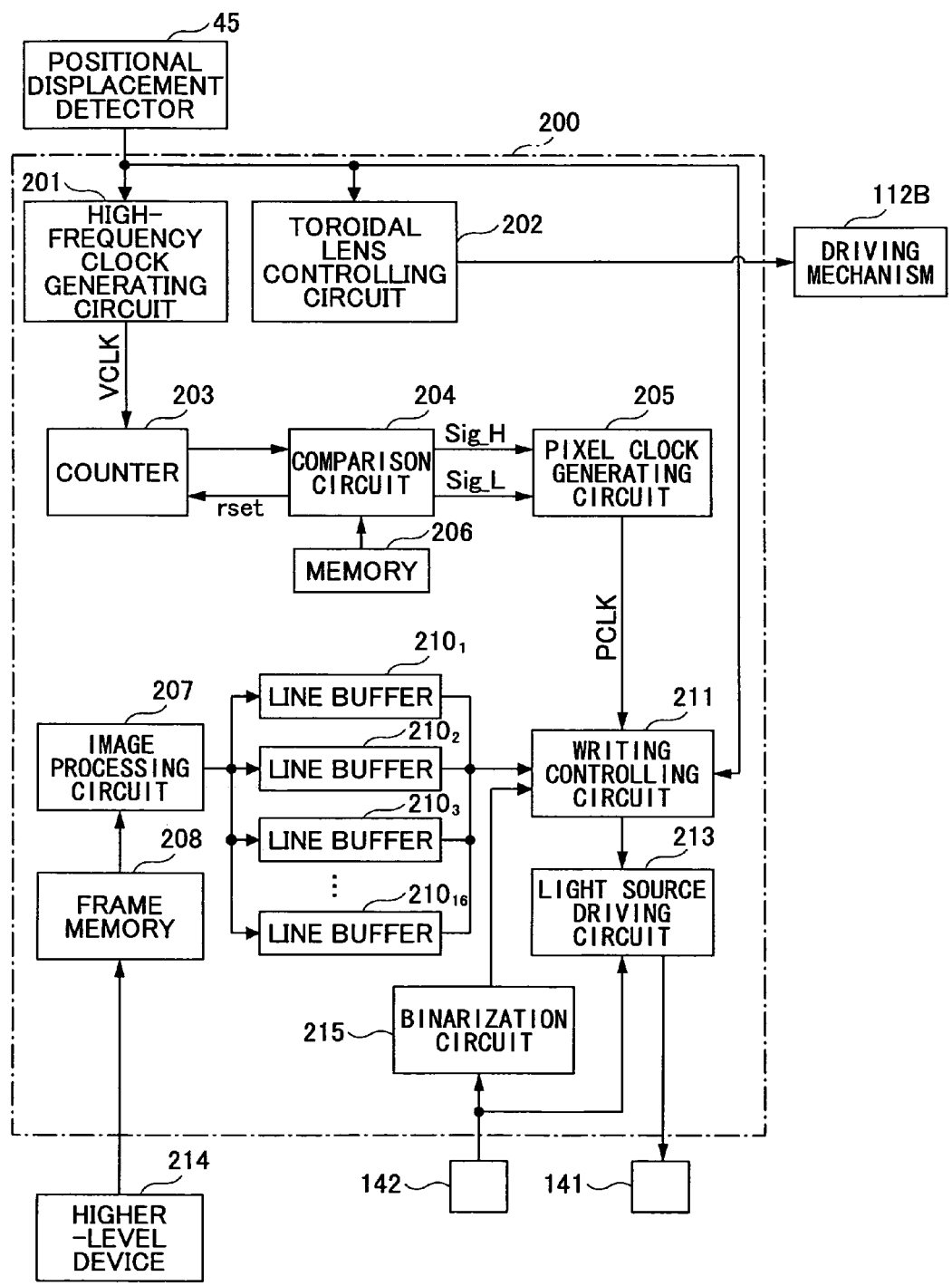
FIG. 10 is a block diagram showing a control circuit of the optical scanning apparatus.

The following describes control circuits of the light source units 130 and 330 in the optical scanning apparatus 100 constructed as mentioned above, with reference to the control circuit 200 of the light source unit 130, for example. The control circuit 200 is formed on the substrate 140 of the light source unit 130. As shown in FIG. 10, the control circuit 200 includes a high-frequency clock generating circuit 201, a toroidal lens controlling circuit 202, a counter 203, a comparison circuit 204, a pixel clock generating circuit 205, an image processing circuit 207, a frame memory 208, line buffers $210_1$ to $210_{16}$, a writing controlling circuit 211, a binarization circuit 215, and a light source driving circuit 213, and the like.

The high-frequency clock generating circuit 201 generates a clock signal VCLK based on information on positional displacement in the main scanning direction supplied from the positional displacement detector 45. Specifically, the high-frequency clock generating circuit 201 outputs the clock signal VCLK so as to cancel a difference between a normal magnification and magnification obtained based on information on the absolute positional displacement of the line patterns K and K' of the detection patterns 43A and 43C from the normal magnification detected by the positional displacement detector 45.

The toroidal lens controlling circuit 202 drives the toroidal lens 107B via the driving mechanism 112B based on information on the inclination of each pattern supplied from the positional displacement detector 45. And, the toroidal lens controlling circuit 202 makes the inclination of a toner image transferred in the second station correspond to the inclination of a toner image formed in the first station.

The counter 203 counts the clock signal VCLK generated in the high-frequency clock generating circuit 201 and supplies a count value to the comparison circuit 204.

The comparison circuit 204 compares the count value supplied from the counter 203 with a setting value L set in advance based on a duty ratio stored in a memory 206 and phase data $H_N$ (N=1, 2, 3 . . . ) in terms of design determined based on a scanning position and the characteristics of a scanning optical system as a transition timing of a pixel clock. If the count value corresponds to the setting value L, the comparison circuit 204 outputs a control signal sig_L. If the count value corresponds to the phase data $H_N$, the comparison circuit 204 outputs a control signal sig_H and supplies a resetting signal to the counter 203.

The pixel clock generating circuit 205 outputs a pixel clock signal PCLK such that it is 1 upon falling edge of the control signal sig_L and 0 upon falling edge of the control signal sig_H supplied from the comparison circuit 204.

Figure 11A:
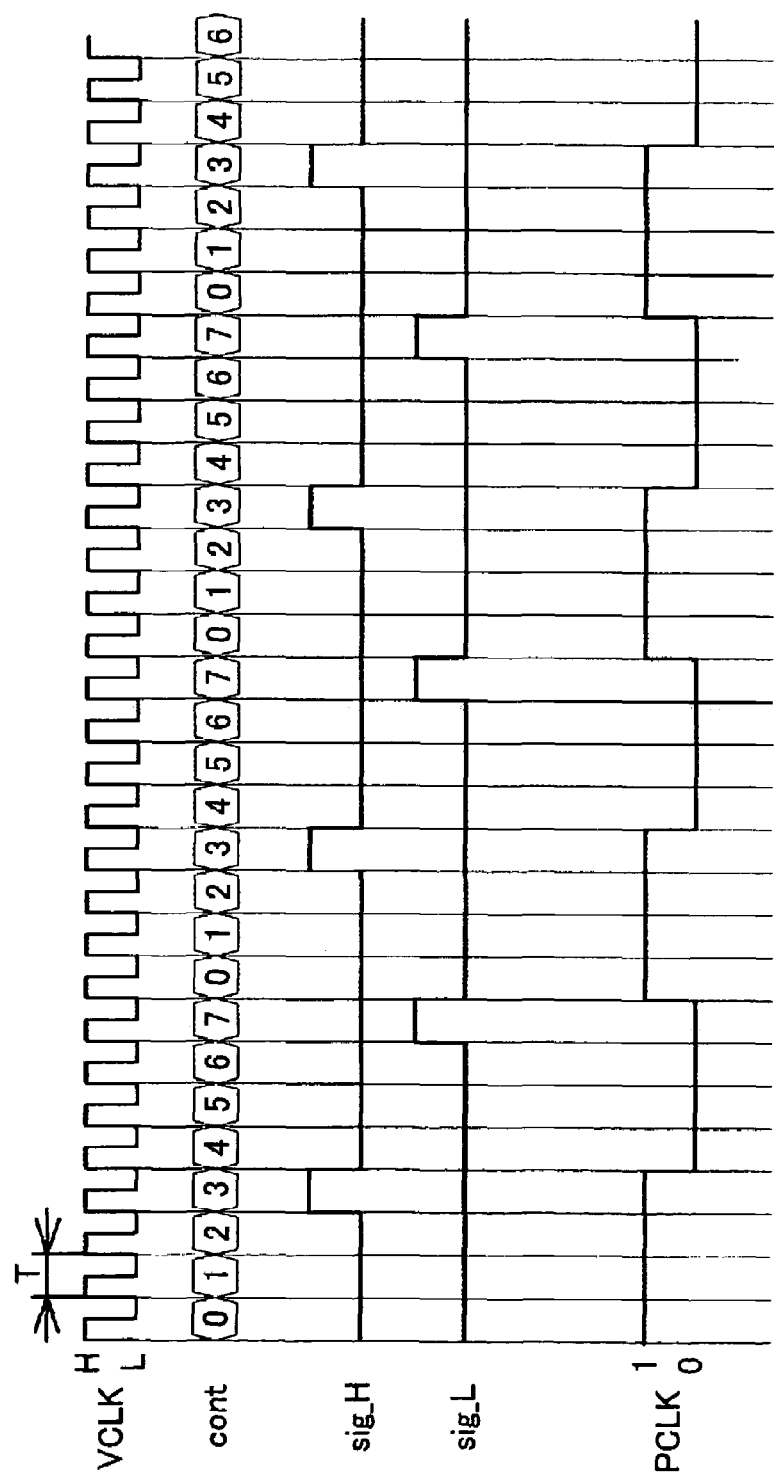
FIG. 11 is a diagram describing a method for generating a pixel clock signal.

In the following, a method for generating such a pixel clock signal is described with reference to FIG. 11A. FIG. 11A shows the clock signal VCLK with a wavelength of T generated by the high-frequency clock generating circuit 201. The clock signal VCLK is counted by the counter 203 in each cycle, and a count value cont is supplied to the comparison circuit 204. The comparison circuit 204 compares the count value cont with the setting value L stored in the memory 206 and the phase data H. In this case, a value of the setting value L is assumed to be 3 based on a duty ratio of 50% and the phase data is assumed to be 7. When the count value cont is 3, the comparison circuit 204 raises the control signal sig_H. When the count value cont is changed from 3, the comparison circuit 204 lowers the control signal sig_H. When the count value cont is 7, the comparison circuit 204 raises the control signal sig_L. When the count value cont is changed from 7, the comparison circuit 204 lowers the control signal sig_H. When the control signal sig_H is lowered, the pixel clock generating circuit 205 changes the pixel clock signal PCLK to be 0. When the control signal sig_L is raised, the pixel clock generating circuit 205 changes the pixel clock signal PCLK to be 1. By repeating the above-mentioned operation, the pixel clock signal PCLK including eight cycles of the clock signal VCLK is generated in the pixel clock generating circuit 205. In the present embodiment, the eight cycles of the clock signal is used as a basic pixel clock signal, and phase-modulation can be performed with ⅛ clock resolution.

Figure 11B:
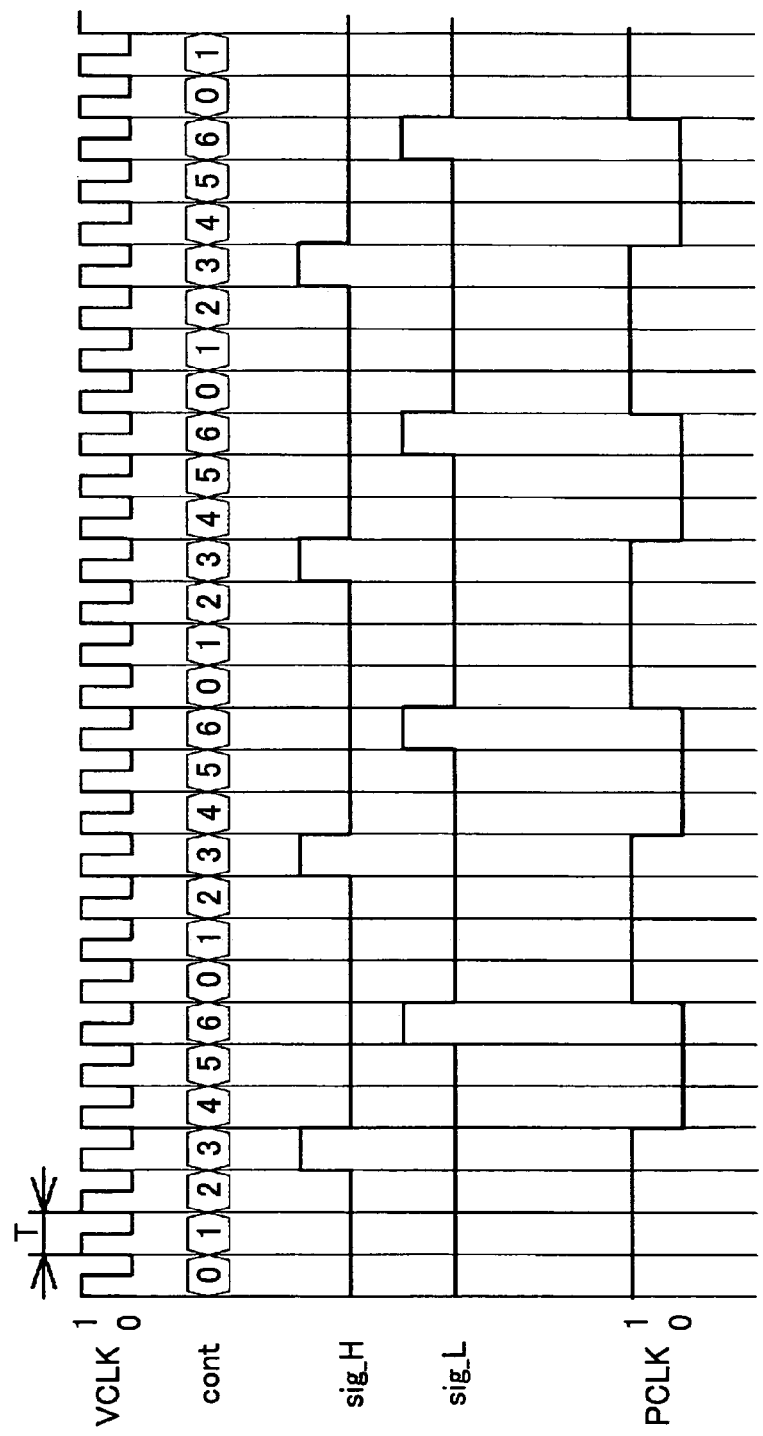

The following describes a case where the pixel clock signal VCLK is phase-modulated by ⅛ clock with reference to FIG. 11B. FIG. 11B shows the clock signal VCLK with a wavelength of T generated by the high-frequency clock generating circuit 201 and a count value cont from the counter 203. In this case, the phase data $H_N$ is modified to be 6. When the count value cont is 3, the comparison circuit 204 raises the control signal sig_H. When the count value cont is changed from 3, the comparison circuit 204 lowers the control signal sig_H. When the count value cont is 6, the comparison circuit 204 raises the control signal sig_L. When the count value cont is changed from 6, the comparison circuit 204 lowers the control signal sig_H. When the control signal sig_H is lowered, the pixel clock generating circuit 205 changes the pixel clock signal PCLK to be 0. When the control signal sig_L is raised, the pixel clock generating circuit 205 changes the pixel clock signal PCLK to be 1. By repeating the above-mentioned operation, it is possible to delay the phase of the pixel clock signal PCLK by ⅛ clock. In other words, in the present embodiment, it is possible to phase-modulate the pixel clock signal PCLK with ⅛ clock resolution by arbitrarily set the value of the phase data H.

With reference to FIG. 10, the frame memory 208 temporarily stores image data supplied from a higher-level device 214, the image data being converted to a raster image.

The image processing circuit 207 reads out the image data stored in the frame memory 208, prepares image data for each luminous source of the laser array 131, and supplies the prepared image data to line buffers $210_1$ to $210_{16}$ corresponding to each luminous source. In this case, image data corresponding to the luminous sources of the first luminous source group G1 is assumed to be stored in the line buffers $210_1$ to $210_8$ and image data corresponding to the luminous sources of the second luminous source group G2 is assumed to be stored in the line buffers $210_9$ to $210_{16}$.

Figure 12:
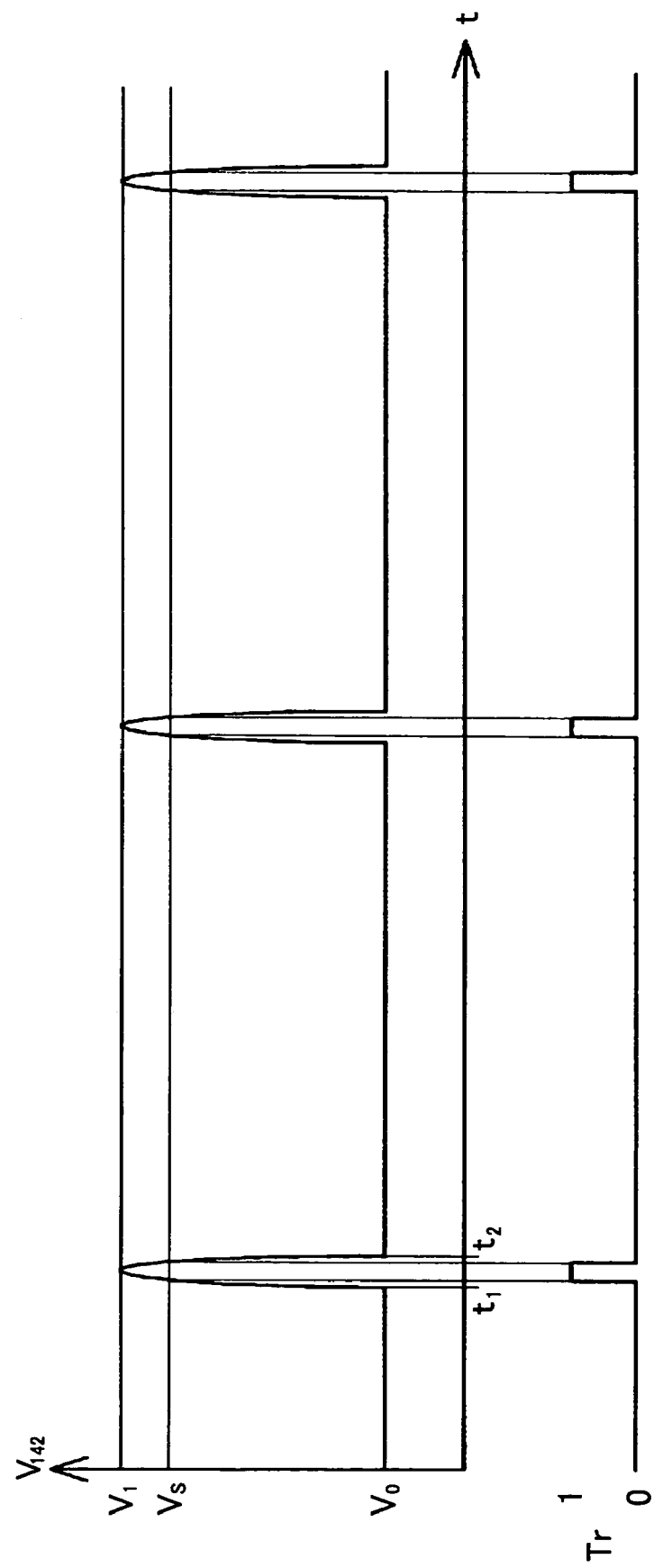
FIG. 12 is a diagram showing a function of a binarization circuit in FIG. 10.

The binarization circuit 215 binarizes signals output from the light receiving element 142 based on a predetermined threshold value, for example. In the following, a method thereof is described with reference to FIG. 12. A light beam emitted from the light source unit 130 is split by the half mirror 101 into a light beam having component of S-polarized light and a light beam having component of P-polarized light. The light beam having component of S-polarized light intermittently enters the light receiving element 142 by being deflected by the polygon mirror 104. On the other hand, the light beam having component of P-polarized light directly enters the light receiving element 142 in a successive manner. The light receiving element 142 outputs a voltage signal $V_{142}$ as shown in FIG. 12 by separately receiving the light beam having component of S-polarized light and the light beam having component of P-polarized light. When the voltage signal $V_{142}$ from the light receiving element 142 is input, the binarization circuit 215 compares a predetermined threshold value $V_0$ with the voltage signal $V_{142}$, generates a binarization signal Tr such that 0 is set when the voltage signal $V_{142}$ is less than the threshold value $V_0$ and 1 is set when the voltage signal $V_{142}$ is not less than the threshold value $V_0$, and performs an output to the writing controlling circuit 211. In this case, as mentioned above, the deflection direction of each luminous source of the laser array 131 is set in the direction indicated by the arrow in FIG. 7 and the angle α is small. Accordingly, the amount of the light beam having component of S-polarized light is substantially larger than that of the light beam having component of P-polarized light. Thus, it is possible to have a threshold value $V_s$ sufficiently larger relative to the voltage $V_0$ corresponding to the light beam having component of P-polarized light.

Figure 13:
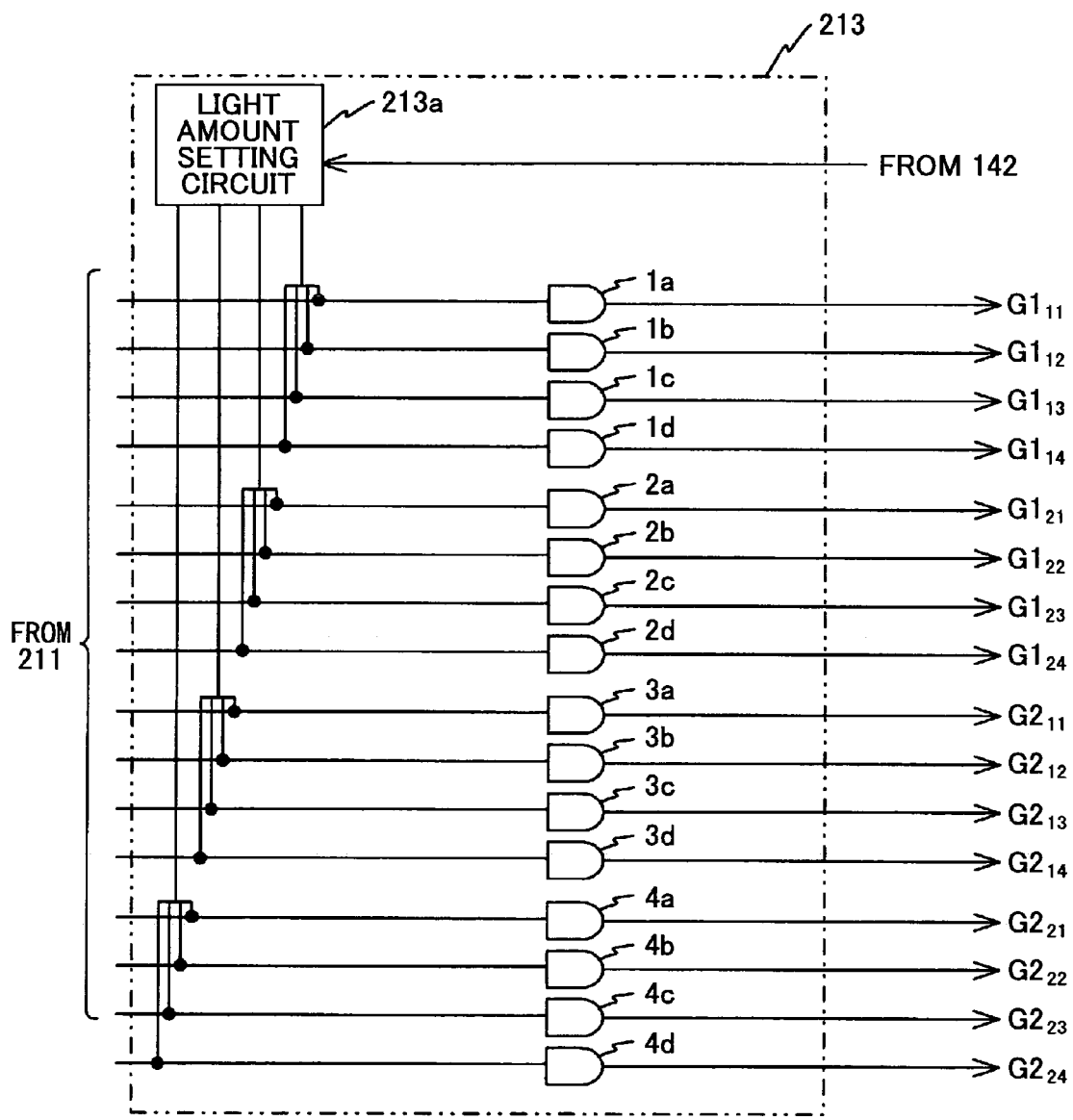
FIG. 13 is a block diagram showing a light source driving circuit in FIG. 10.

As shown in FIG. 13, the light source driving circuit 213 includes light source driving units 1a, 1b, 1c, 1d, 2a, 2b, 2c, and 2d for driving the first luminous source group G1 and light source driving units 3a, 3b, 3c, 3d, 4a, 4b, 4c, and 4d for driving the second luminous source group G2 of the laser array 131, and a light amount setting circuit 213a. Each of the light source driving units 1a to 1d, 2a to 2d, 3a to 3d, and 4a to 4d drives corresponding luminous source based on a driving signal modulated in accordance with the image information supplied from the writing controlling circuit 211, using power set by the light amount setting circuit 213a.

The light amount setting circuit 213a drives each of the luminous sources successively upon scanning a non-image area, monitors the amount of light thereof using the light receiving element 142 of the light source unit 130, and sets power output from each of the light source driving units 1a to 1d, 2a to 2d, 3a to 3d, and 4a to 4d so as to have a predetermined amount of light. In the following, this operation is referred to as a first light emission mode.

The writing controlling circuit 211 reads out pixel data in each luminous source in synchronization with the falling edge of the binarization signal Tr from the binarization circuit 215, for example, superposes the image data on the pixel clock signal PCLK supplied from the pixel clock generating circuit 205, and generates modulation data independently in each luminous source. Then, based on information on positional displacement in the X axis direction (sub-scanning direction) from the positional displacement detector 45, the writing controlling circuit 211 selects a first light source driving unit to supply the modulation data in each luminous source group among the light source driving units 1a to 1d, 2a to 2d, 3a to 3d, and 4a to 4d of the light source driving circuit 213. Based on the selected light source driving unit, the light source driving units 1a to 1d, 2a to 2d, 3a to 3d, and 4a to 4d are consecutively selected so as to supply the modulation data thereto.

Specifically, in the first luminous source group G1, when a toner image is formed on the transfer belt 40 by performing eight line scanning in a single scanning, the top line thereof is scanned by the luminous source $G1_{11}$. For example, when the toner image is to be displaced by 1 line in the sub-scanning direction and formed, the luminous source $G1_{12}$ is selected as a luminous source for scanning the top line. Based on this luminous source $G1_{12}$, first, seven line scanning is performed using the luminous sources $G1_{12}$, $G1_{13}$, $G1_{14}$, $G1_{21}$, $G1_{22}$, $G1_{23}$, and $G1_{24}$. From a second scanning, eight line scanning is performed using all the luminous sources of the first luminous source group G1. In the same manner, by selecting the luminous source $G1_{13}$, $G1_{14}$, ... $G1_{24}$ as a luminous source for scanning the top line, it is possible to displace the toner image by 2 lines to 7 lines in the sub-scanning direction. Thus, by performing the above-mentioned correction processing in a case where positional displacement in the sub-scanning direction is detected by the positional displacement detector 45, it is possible to finely adjust the position of the toner image in comparison with a conventional technique for changing a time of entering the polygon mirror 104. Usually, the above-mentioned correction processing is performed together with the processing for changing the time of entering the polygon mirror 104 in accordance with positional displacement.

Upon supplying the modulation data to the light source driving circuit 213, in view of regular positional arrangement of each luminous source, each set of modulation data is supplied to the light source driving circuit 213 at a time such that the same start position of scanning is used in each luminous source. In accordance with this, each luminous source is driven based on the modulation data. In the following, this operation is referred to as a second light emission mode.

Figure 14:
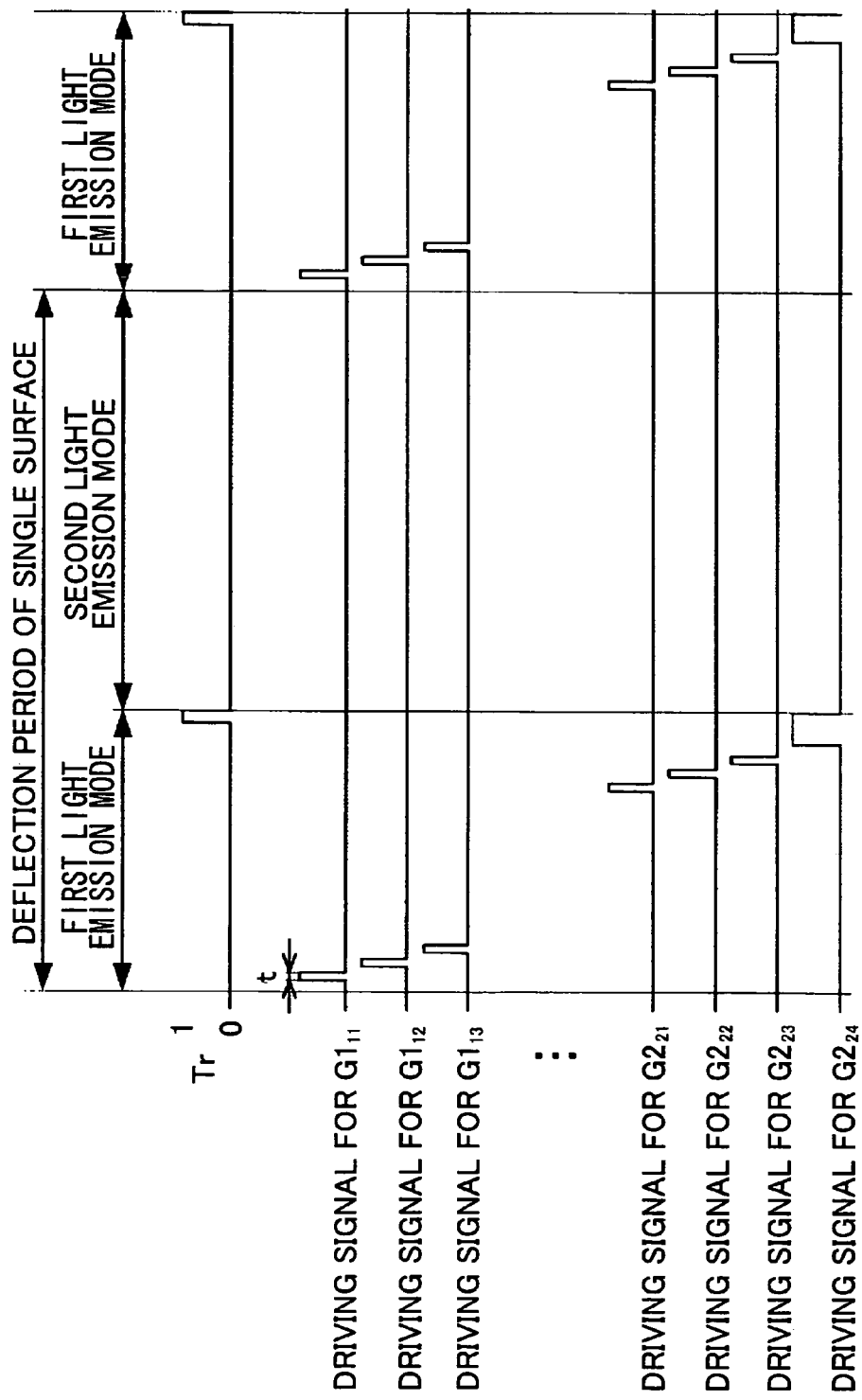
FIG. 14 is a timing chart of a first light emission mode and a second light emission mode.

FIG. 14 is a timing chart of the first light emission mode and the second light emission mode. As shown in FIG. 14, when the deflection surfaces of the polygon mirror 104 are changed, the first light emission mode is started simultaneously. Specifically, by monitoring a voltage signal from the light receiving element 142 and supplying each of the light source driving units $1a$ to $1d$, $2a$ to $2d$, $3a$ to $3d$, and $4a$ to $4d$ with a driving signal for the luminous sources $G1_{11}$ to $G2_{24}$ consecutively for t second, the light amount setting circuit 213a consecutively causes the luminous sources $G1_{11}$ to $G2_{24}$ to emit light and sets the amount of each light. When the setting of the amount of light of luminous source $G2_{24}$ is finished, the light amount setting circuit 213a maintains the driving of the luminous source $G2_{24}$. When the voltage signal Tr is output from the binarization circuit 215 due to the light beam from the luminous source $G2_{24}$, the second mode is started. In addition, the first light emission mode is ended while the light beam scans a non-image area.

In the control circuit 200 as constructed above, when image information from the higher-level device 214 is received, the light source units 130 and 330 are driven from modulation data based on the image information and toner images of image elements of each color are superimposed and formed on the transfer belt 40 in the first to fourth stations. The toner images are transferred to the paper 61 supplied from the paper feed tray 60 by the transfer charger 48 and fixed by the fuser roller 50 as shown in FIG. 1. The image-formed paper 61 is ejected by the paper ejecting roller 58 and successively stacked in the paper ejection tray 12a.

As mentioned above, according to the optical scanning apparatus 100 of the present embodiment, the light beams emitted from the luminous sources of the light source units 130 and 330 are split by the half mirror 101 into the light beam having component of S-polarized light and the light beam having component of P-polarized light. The light beam having component of S-polarized light intermittently enters the light receiving element 142 via the polygon mirror 104. The light beam having component of P-polarized light directly and continuously enters the light receiving element 142. Thus, it is possible to share the photo-detection system so as to monitor the amount of light of the light beam and to detect the deflected light beam for generating a synchronization signal (Tr). Accordingly, it is possible to reduce the number of members of the apparatus while maintaining scanning accuracy and to reduce a production cost thereof as a result.

Further, since the output of each luminous source of the laser array 131 is adjusted before scanning, it is possible to prevent the generation of irregularity of thickness in a printed image. Also, it is possible to effectively prevent the degradation of image quality resulting from a change of the tint of color especially in a multicolor image.

The polarization direction of each luminous source of the laser array 131 is set in the same direction, so that reflection properties thereof are the same between the light beams in the polygon mirror 104 and each reflecting mirror in the optical scanning system. Thus, thickness between the scanning lines is the same, so that it is possible to perform image forming using high-quality multi-beam scanning and to efficiently use the amount of light.

In the present embodiment, a monitoring signal of the light source is generated from a signal of the light receiving element 142 prior to binarization, and a synchronization signal for adjusting a time of writing is generated from the binarized signal. Thus, the signal processing circuit is shared and the number of members is reduced, thereby realizing a low cost.

The laser array 131, the light receiving element 142, and the control circuit 200 are mounted on the same substrate 140, so that wiring from the light receiving element 142 to the laser array 131 can be short. Thus, it is possible to certainly and correctly perform controlling of the light sources and setting of the amount of light with little influence from noise and attenuation even in a case of a feeble signal. Accordingly, it is possible to form a high-quality image.

The light beam deflected by the polygon mirror 104 is directly received by the light receiving element 142 without involving imaging optical system (toroidal lenses 107A, 107B, 307C, and 307D). Thus, even when there is a difference in wavelength among the luminous sources, a difference of magnification in the main scanning direction due to the imaging optical system is less likely to be generated and it is possible to have the same time of synchronized detection among the luminous sources, so that it is possible to perform high-quality image forming without color drift.

In the incidence planes of the toroidal lenses 107A, 107B, 307C, and 307D, saw-toothed diffraction planes are formed. In the diffraction planes, power is set so as to correct focus movement at least in the main scanning direction resulting from a difference in wavelength among light beams emitted from each luminous source. Thus, even if there is a difference in wavelength among light beams, it is possible to correct the difference of magnification in the main scanning direction using the power set in the diffraction planes. Thus, it is possible to have the same magnification for each scanning line in the main scanning direction and perform a high-quality image forming without color drift.

The light receiving element is shared for each luminous source of the laser array 131, so that it is possible to adjust an output from each luminous source without sensitivity dispersion thereof. Thus, it is possible to perform a high-quality image forming without a change of the tint of color.

Also, the image forming apparatus 10 according to the present embodiment includes the optical scanning apparatus 100. Thus, it is possible to reduce the number of members of the apparatus and a production cost while maintaining picture quality.

Figure 15:
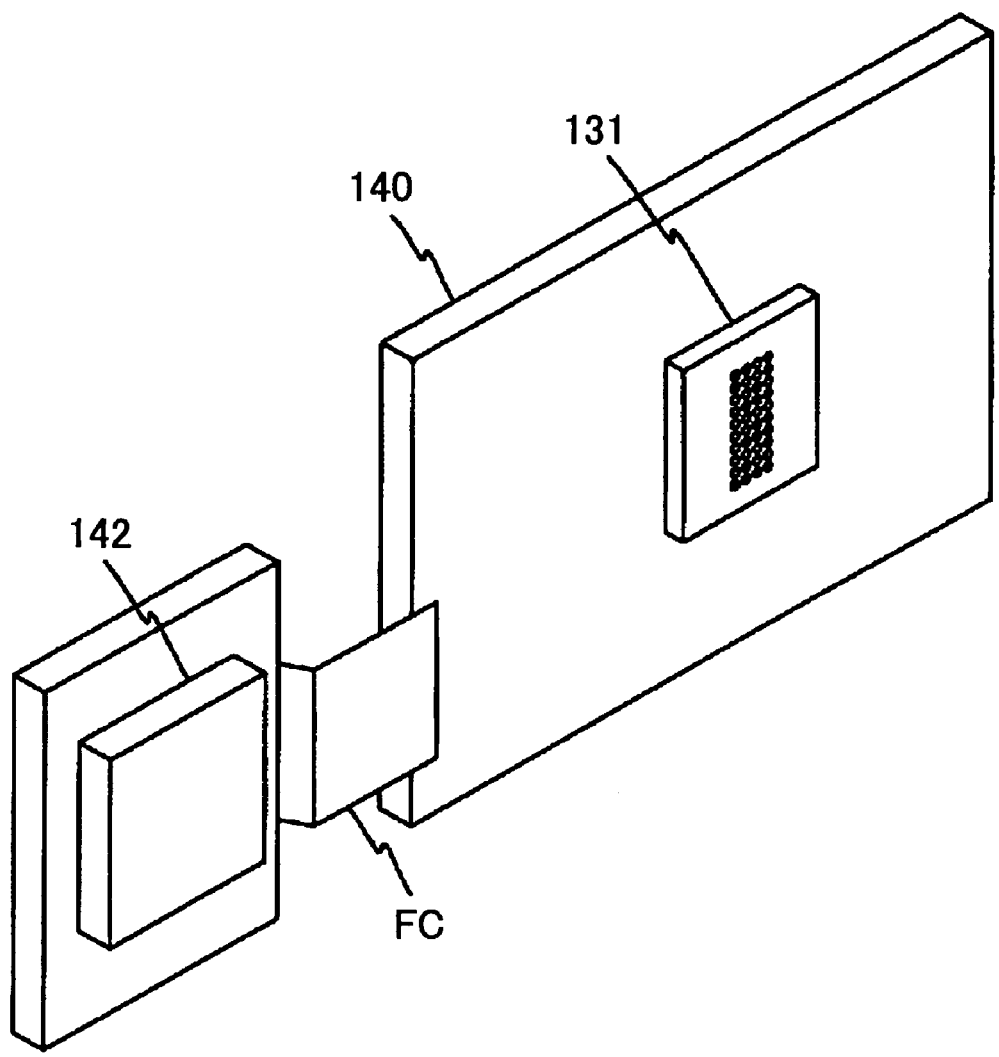
FIG. 15 is a diagram showing a variation of a layout of a light receiving element.

In addition, the light source units 130 and 330 are described based on the case where the light receiving element 142 is mounted on the substrate 140. However, the light source units 130 and 330 are not limited to this example but may be connected to the substrate 140 via a flexible cable FC as shown in FIG. 15.

In the above-mentioned embodiment, the optical scanning apparatus 100 of the present invention is described based on the case where it is applied to a printer. However, the optical scanning apparatus 100 is preferably used for an image forming apparatus other than a printer, such as a copying machine, facsimile, or a complex machine in which these devices are integrated, for example.

The present invention is not limited to the specifically disclosed embodiment, and variations and modifications may be made without departing from the scope of the present invention.

The present application is based on Japanese priority application No. 2005-226118 filed Aug. 4, 2005, the entire contents of which are hereby incorporated herein by reference.

What is claimed is:

1. An optical scanning apparatus for scanning a scanning surface using a light beam, the optical scanning apparatus comprising:
   a light source including a plurality of luminous sources emitting a plurality of light beams;
   a deflection unit deflecting a first portion of the plurality of light beams, different than a second portion of the plurality of light beams;
   a light guiding unit guiding the second portion of the plurality of light beams to a predetermined direction without using the deflection unit; and
   a photo-detection system comprising a common detection unit receiving the deflected first portion of the plurality of light beams and the second portion of the plurality of light beams and outputting a signal monitoring an amount of light from the light source and a synchronization signal based on the first and second portions of the plurality of light beams.

2. The optical scanning apparatus according to claim 1, further comprising:
   a light source driving unit performing, until the photo-detection system detects the deflected first portion of the plurality of light beams, driving the plurality of luminous sources in a successive manner, monitoring a signal based on a light beam from the driven luminous source, the signal being output from the photo-detection system, and setting output of each of the plurality of luminous sources.

3. The optical scanning apparatus according to claim 1, wherein the light guiding unit splits the plurality of light beams into the first portion of the plurality of light beams in a direction of the deflection unit and the second portion of the plurality of light beams in the predetermined direction.

4. The optical scanning apparatus according to claim 1, wherein each deflection direction of the plurality of luminous sources is set in a same direction and the light guiding unit guides either component of S-polarized light or component of P-polarized light of each of the plurality of light beams.

5. The optical scanning apparatus according to claim 1, wherein the photo-detection system outputs a signal based on an intensity signal based on intensity of received light beams and a binarized signal obtained by binarizing the intensity signal.

6. The optical scanning apparatus according to claim 1, wherein the light source and the photo-detection system are mounted on a same substrate.

7. The optical scanning apparatus according to claim 1, further including:
   an imaging optical system for imaging light beams on the scanning surface, the light beams being deflected using the deflection unit, wherein
   the photo-detection system directly receives the deflected first portion of the plurality of light beams without using the imaging optical system.

8. The optical scanning apparatus according to claim 7, wherein the imaging optical system includes an optical element in which a diffraction plane for diffracting light beams deflected by the deflection unit is formed, and the diffraction plane has power for correcting focus movement regarding a deflection direction of the light beams depending on a difference in wavelength among the light beams.

9. An image forming apparatus for forming an image by fixing a toner image on a recording medium, the toner image being formed based on a latent image obtained from image information, the image forming apparatus comprising:
   an optical scanning apparatus for scanning a scanning surface using a light beam; and a photoconductor having a scanning surface in which a latent image is formed by the optical scanning apparatus, wherein the optical scanning apparatus includes:
      a light source including a plurality of luminous sources emitting a plurality of light beams;
      a deflection unit collectively deflecting a first portion of the plurality of light beams, different from a second portion of the plurality of light beams;
      a light guiding unit guiding the second portion of the plurality of light beams to a predetermined direction without using the deflection unit; and
      a photo-detection system comprising a common detection unit receiving the deflected first portion of the plurality of light beams and the second portion of the plurality of light beams and outputting a signal monitoring an amount of light from the light source and a synchronization signal based on the first and second portions of the plurality of light beams.

10. An image forming apparatus for forming a multicolor image by superimposing and fixing toner images on a recording medium, the toner images being formed based on latent images of each color obtained from information on a multicolor image, the image forming apparatus comprising:
   an optical scanning apparatus for scanning a scanning surface using a light beam; and a plurality of photoconductors in which a latent image for each color is formed by the optical scanning apparatus, wherein the optical scanning apparatus includes:
      a light source including a plurality of luminous sources emitting a plurality of light beams;
      a deflection unit deflecting a first portion of the plurality of light beams, different than a second portion of the plurality of light beams;
      a light guiding unit guiding the second portion of the plurality of light beams to a predetermined direction without using the deflection unit;
      a photo-detection system comprising a common detection unit receiving the deflected first portion of the plurality of light beams and the second portion of the plurality of light beams and outputting a signal based on the received deflected first portion of the plurality of light beams and the second portion of the plurality of light beams; and
      an imaging optical system for imaging light beams on the scanning surface, the light beams being deflected using the deflection unit, wherein
      the photo-detection system directly receives the deflected first portion of the plurality of light beams without using the imaging optical system, and
   the plurality of luminous sources correspond to the plurality of photoconductors and the imaging optical system of the optical scanning apparatus forms images of light beams from the plurality of luminous sources on a scanning surface of the corresponding photoconductors.

* * * * *